(12) United States Patent
Takahashi et al.

(10) Patent No.: US 11,010,328 B2
(45) Date of Patent: May 18, 2021

(54) COMMUNICATION APPARATUS, COMMUNICATION METHOD, PROGRAM, AND COMMUNICATION SYSTEM

(71) Applicant: Sony Semiconductor Solutions Corporation, Kanagawa (JP)

(72) Inventors: Hiroo Takahashi, Kanagawa (JP); Naohiro Koshisaka, Kanagawa (JP)

(73) Assignee: Sony Semiconductors Solutions Corporation, Kanagawa (JP)

( * ) Notice: Subject to any disclaimer, the term of this patent is extended or adjusted under 35 U.S.C. 154(b) by 0 days.

(21) Appl. No.: 16/491,035

(22) PCT Filed: Mar. 9, 2018

(86) PCT No.: PCT/JP2018/009153
§ 371 (c)(1),
(2) Date: Sep. 4, 2019

(87) PCT Pub. No.: WO2018/173796
PCT Pub. Date: Sep. 27, 2018

(65) Prior Publication Data
US 2020/0012615 A1    Jan. 9, 2020

(30) Foreign Application Priority Data

Mar. 23, 2017    (JP) .............................. JP2017-058247

(51) Int. Cl.
*G06F 13/42*    (2006.01)
*H04L 12/40*    (2006.01)
(Continued)

(52) U.S. Cl.
CPC .......... *G06F 13/4291* (2013.01); *G06F 13/38* (2013.01); *H04L 5/1438* (2013.01);
(Continued)

(58) Field of Classification Search
CPC .... G06F 13/364; G06F 13/38; G06F 13/4009; G06F 13/42; G06F 13/4291;
(Continued)

(56) References Cited

U.S. PATENT DOCUMENTS 5,425,023 A * 6/1995 Haraguchi .............. H04L 12/66
370/400
6,711,178 B1 * 3/2004 O'Gorman .............. H04L 41/00
370/393
(Continued)

FOREIGN PATENT DOCUMENTS

JP      01-258525 A    10/1989
JP    2015-014951 A     1/2015
(Continued)

OTHER PUBLICATIONS

"USB Attached SCSI Protocol (UASP)". Revision 1.0. Jun. 24, 2009. USB Implementers Forum, Inc. (Year: 2009).*
(Continued)

*Primary Examiner* — Thomas J. Cleary
(74) *Attorney, Agent, or Firm* — Michael Best & Friedrich LLP

(57) ABSTRACT

The present disclosure relates to a communication apparatus, a communication method, a program, and a communication system that enable more reliable communication. An I3C master receives a max read length and a max write length from an I3C slave. Then, when transmitting/receiving data to/from the I3C slave, the I3C master controls transmission/reception of the data so that the data to be transferred in one data transfer has a data length equal to or shorter than the max read length and the max write length, and transmits transfer length information indicating the data
(Continued)

length of the data to be transferred, prior to data transfer of the data. The present technology is applicable to a bus IF, for example.

13 Claims, 27 Drawing Sheets

(51) Int. Cl.
| | | |
|---|---|---|
| *G06F 13/38* | (2006.01) | |
| *H04L 5/14* | (2006.01) | |
| *G06F 13/364* | (2006.01) | |
| *H04L 1/00* | (2006.01) | |

(52) U.S. Cl.
CPC ...... *H04L 12/40032* (2013.01); *G06F 13/364* (2013.01); *G06F 2213/0016* (2013.01); *H04L 1/0063* (2013.01); *H04L 12/40156* (2013.01)

(58) Field of Classification Search
CPC .......... G06F 2213/0016; H04L 1/0063; H04L 5/1438; H04L 5/1446; H04L 13/40032; H04L 12/40156; H04L 12/40032
See application file for complete search history.

(56) References Cited

U.S. PATENT DOCUMENTS

| | | | | |
|---|---|---|---|---|
| 8,090,801 | B1* | 1/2012 | Pillai | G06F 9/544 |
| | | | | 709/217 |
| 8,402,180 | B2* | 3/2013 | Fredriksen | G06F 13/385 |
| | | | | 710/33 |
| 9,960,981 | B2* | 5/2018 | Takahashi | H04L 47/806 |
| 10,116,542 | B2* | 10/2018 | Takahashi | H04L 1/0045 |
| 2001/0036185 | A1* | 11/2001 | Dempo | H04L 47/10 |
| | | | | 370/392 |
| 2002/0141448 | A1* | 10/2002 | Matsunaga | H04L 47/36 |
| | | | | 370/469 |
| 2003/0172201 | A1* | 9/2003 | Hatae | H04L 47/365 |
| | | | | 710/8 |
| 2004/0120340 | A1* | 6/2004 | Furey | H04L 69/22 |
| | | | | 370/429 |
| 2005/0083968 | A1 | 4/2005 | Chan et al. | |
| 2006/0143319 | A1* | 6/2006 | Hsu | G06F 13/385 |
| | | | | 710/8 |
| 2008/0034147 | A1* | 2/2008 | Stubbs | G06F 13/4018 |
| | | | | 710/315 |
| 2008/0263307 | A1* | 10/2008 | Adachi | G06F 13/1605 |
| | | | | 711/171 |
| 2008/0270643 | A1* | 10/2008 | Tashiro | G06F 13/28 |
| | | | | 710/35 |
| 2009/0094401 | A1* | 4/2009 | Larson | H04L 47/24 |
| | | | | 710/316 |
| 2010/0118735 | A1* | 5/2010 | Pandit | H04L 12/433 |
| | | | | 370/254 |
| 2010/0235655 | A1* | 9/2010 | Tauscher | G06F 13/387 |
| | | | | 713/300 |
| 2010/0268822 | A1* | 10/2010 | Calippe | H04L 41/0816 |
| | | | | 709/225 |
| 2011/0142070 | A1* | 6/2011 | Lim | H04L 69/16 |
| | | | | 370/470 |
| 2011/0289273 | A1* | 11/2011 | Ikeuchi | G06F 3/0632 |
| | | | | 711/114 |
| 2012/0166681 | A1 | 6/2012 | Suzuki | |
| 2014/0250158 | A1* | 9/2014 | Tang | H04L 67/06 |
| | | | | 707/827 |
| 2014/0268229 | A1* | 9/2014 | Kempka | G06F 9/4413 |
| | | | | 358/1.15 |
| 2014/0269854 | A1* | 9/2014 | Wong | G06F 13/4291 |
| | | | | 375/219 |
| 2014/0344485 | A1* | 11/2014 | Dondini | G06F 13/28 |
| | | | | 710/22 |
| 2015/0074312 | A1* | 3/2015 | Barus | G06F 13/4027 |
| | | | | 710/306 |
| 2016/0077982 | A1* | 3/2016 | Ding | G06F 13/4068 |
| | | | | 710/313 |
| 2016/0294544 | A1* | 10/2016 | Jang | H04L 7/0037 |
| 2017/0126779 | A1* | 5/2017 | Dong | H04L 67/2842 |
| 2018/0165238 | A1* | 6/2018 | Depew | G06F 13/122 |
| 2018/0213063 | A1* | 7/2018 | Vajravel | H04L 41/046 |
| 2019/0026034 | A1* | 1/2019 | Tashiro | G06F 12/0873 |
| 2019/0250855 | A1* | 8/2019 | Kachare | G06F 3/061 |
| 2019/0278485 | A1* | 9/2019 | Benisty | G06F 13/4295 |

FOREIGN PATENT DOCUMENTS

| | | |
|---|---|---|
| JP | 2015-153279 A | 8/2015 |
| JP | 2016-018319 A | 2/2016 |

OTHER PUBLICATIONS

"USB Background". Total Phase Knowledge Base. Online Jan. 5, 2017. Retrieved from Internet May 8, 2020. <https://web.archive.org/web/20170105120740/https://www.totalphase.com/support/articles/200349256-USB-Background>. (Year: 2017).*

'Upper Layer Protocol' in The Free On-Line Dictionary of Computing. Online Feb. 17, 1999. Retrieved from Internet Oct. 19, 2020. <https://foldoc.org/upper+layer+protocols>. (Year: 1999).*

Extended European Search Report dated Feb. 10, 2020 for corresponding European Application No. 18772411.7.

* cited by examiner

FIG. 5
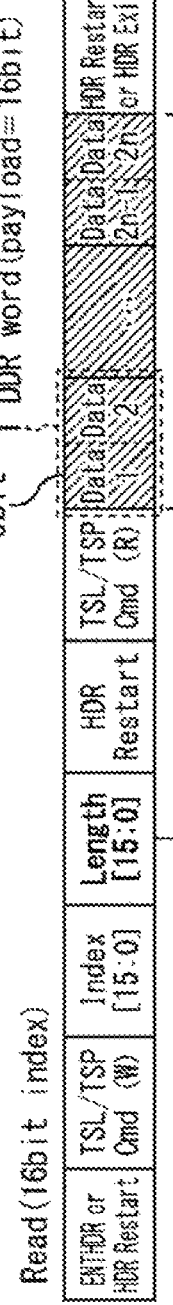
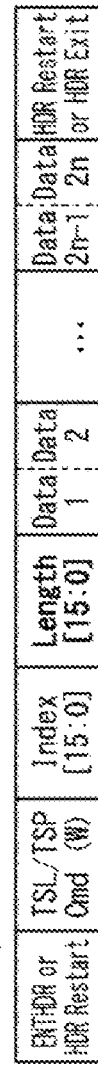

COMMUNICATION APPARATUS, COMMUNICATION METHOD, PROGRAM, AND COMMUNICATION SYSTEM

TECHNICAL FIELD

The present disclosure relates to a communication apparatus, a communication method, a program, and a communication system, and in particular, to a communication apparatus, a communication method, a program, and a communication system that enable more reliable communication.

BACKGROUND ART

Hitherto, as a bus IF (Interface) for controlling registers of various devices, the CCI (Camera Control Interface) has been widely used. In the CCI, the I2C (Inter-Integrated Circuit) standard is employed for a physical layer.

In the CCI, when data transfer is to be started, for example, a system controller notifies in advance a controlled device of an initial address (Index) of a register which has data to be read out or to which data is to be written. The system controller then determines, for every one-byte data transfer, whether or not a desired amount of data has been read out from or written to the register. Then, in a case where the system controller determines that the desired amount of data has been read out from or written to the register, control for ending the data transfer is performed.

For example, PTL 1 discloses a technology in which a master device serially outputs an address of a slave device, a write instruction, an address of a register to which data is to be written, and write data to an I2C bus so that the slave device writes the data to the register.

CITATION LIST

Patent Literature

[PTL 1]
Japanese Patent Application Laid-open No. 2016-018319

SUMMARY

Technical Problem

As described above, in the CCI, the I2C standard is employed for a physical layer. Thus, a transmission rate is at most 1 Mbps, that is, transmission speed is low, and an increase in transmission speed has therefore been demanded. To meet the demand, as a next generation standard, the I3C (Improved Inter Integrated Circuit) standard that achieves a transmission rate of at most 37.5 Mbps, that is, high transmission speed, has been defined and revised. Further, a novel CCI in which the I3C is used for a physical layer has been studied.

Incidentally, when a case where a frame structure having a data length (number of bytes) of data to be transferred in data transfer is employed in an HDR mode of the I3C is considered, there is a concern that the novel CCI and the I3C conflict with each other, resulting in a communication failure.

The present disclosure has been made in view of such a circumstance and enables more reliable communication.

Solution to Problem

A communication apparatus according to one aspect of the present disclosure is a communication apparatus configured to establish communication via a bus by a first communication apparatus that has an initiative in communication and at least one second communication apparatus configured to establish communication under control by the first communication apparatus, in which the first communication apparatus includes: an acquisition unit configured to acquire, from the at least one second communication apparatus, a max transfer length indicating a maximum transfer length that the at least one second communication apparatus is transferable in one data transfer; a transmission/reception control unit configured to control transmission/reception of data so that data to be transferred in one data transfer has a data length equal to or shorter than the max transfer length in data transfer to/from the at least one second communication apparatus; and a transmission unit configured to transmit transfer length information indicating the data length of the data to be transferred, prior to data transfer of the data.

A communication method or program according to one aspect of the present disclosure is a communication method for establishing communication via a bus by a first communication apparatus that has an initiative in communication and at least one second communication apparatus configured to establish communication under control by the first communication apparatus, the communication method including the steps of: by the first communication apparatus, acquiring, from the at least one second communication apparatus, a max transfer length indicating a maximum transfer length that the at least one second communication apparatus is transferable in one data transfer; controlling transmission/reception of data so that data to be transferred in one data transfer has a data length equal to or shorter than the max transfer length in data transfer to/from the at least one second communication apparatus; and transmitting transfer length information indicating the data length of the data to be transferred, prior to data transfer of the data.

A communication system according to one aspect of the present disclosure is a communication system configured to establish communication by a first communication apparatus that has an initiative in communication via a bus and at least one second communication apparatus configured to establish communication under control by the first communication apparatus, in which the first communication apparatus includes: an acquisition unit configured to acquire, from the at least one second communication apparatus, a max transfer length indicating a maximum transfer length that the at least one second communication apparatus is transferable in one data transfer; a transmission/reception control unit configured to control transmission/reception of data so that data to be transferred in one data transfer has a data length equal to or shorter than the max transfer length in data transfer to/from the at least one second communication apparatus; and a transmission unit configured to transmit transfer length information indicating the data length of the data to be transferred, prior to data transfer of the data.

According to one aspect of the present disclosure, a max transfer length indicating a maximum transfer length that a second communication apparatus is transferable in one data transfer is acquired from the second communication apparatus, transmission/reception of data is controlled so that data to be transferred in one data transfer has a data length equal to or shorter than the max transfer length in data transfer to/from the second communication apparatus, and transfer length information indicating the data length of the data to be transferred is transmitted prior to data transfer of the data.

Advantageous Effect of Invention

According to one aspect of the present disclosure, communication can be more reliably established.

BRIEF DESCRIPTION OF DRAWINGS

FIG. 5 is a diagram illustrating a format in a TSL/TSP mode.

DESCRIPTION OF EMBODIMENTS

Now, specific embodiments to which the present technology is applied are described in detail with reference to the drawings.

<Configuration Example of Bus IF>

Figure 1:
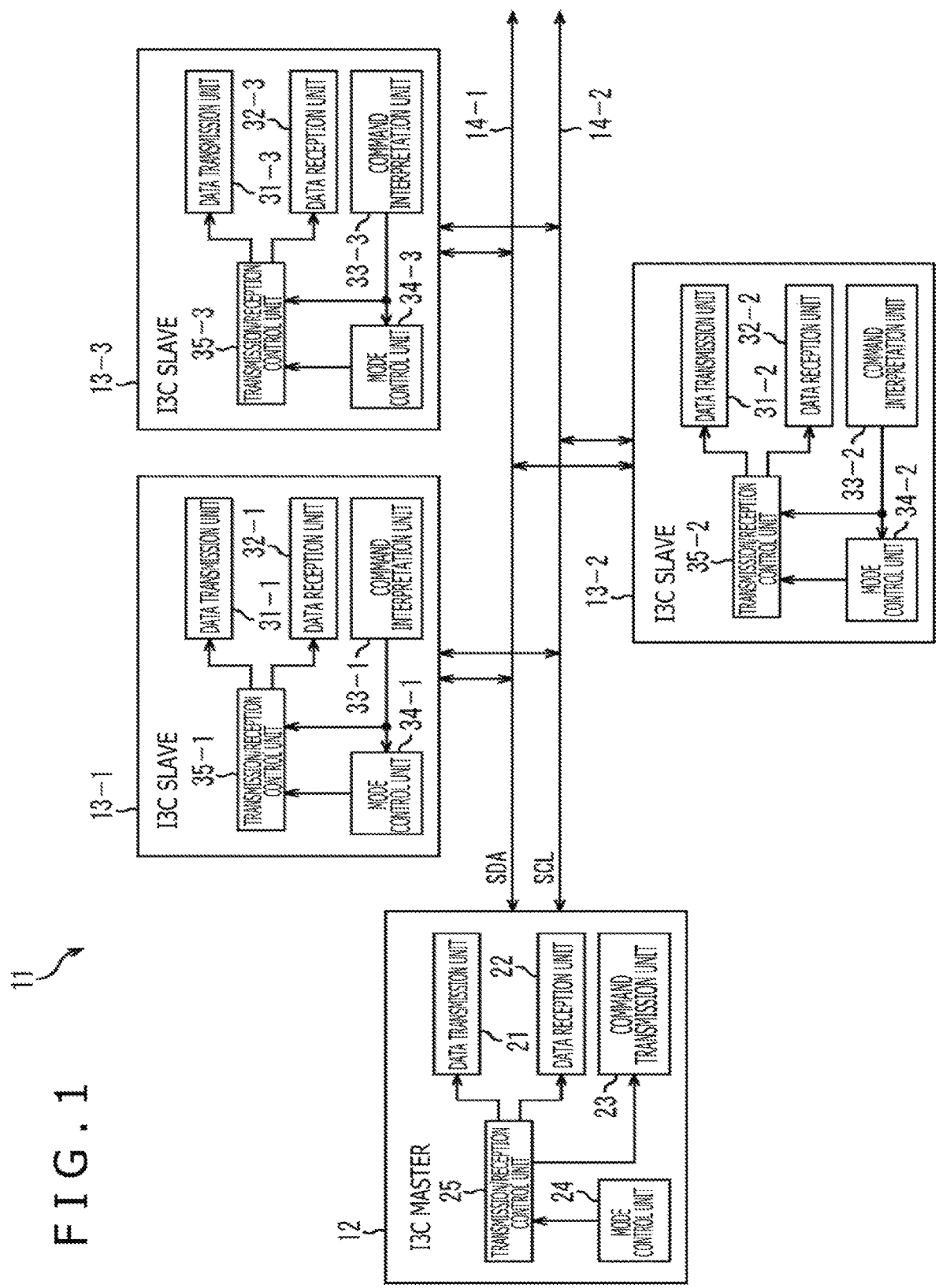
FIG. 1 is a block diagram illustrating a configuration example of a bus IF according to one embodiment to which the present technology is applied.

FIG. 1 is a block diagram illustrating a configuration example of a bus IF according to one embodiment to which the present technology is applied.

A bus IF 11 illustrated in FIG. 1 includes an I3C master 12 and three I3C slaves 13-1 to 13-3 that are connected to each other via a data signal line 14-1 and a clock signal line 14-2, and can establish communication in accordance with the I3C standard.

The I3C master 12 has the initiative in control in the bus IF 11 and can establish communication with the I3C slaves 13-1 to 13-3 via the data signal line 14-1 and the clock signal line 14-2.

The I3C slaves 13-1 to 13-3 can establish communication with the I3C master 12 via the data signal line 14-1 and the clock signal line 14-2 under the control by the I3C master 12. Note that, the I3C slaves 13-1 to 13-3 have similar configurations, and are simply referred to as "I3C slave 13" in the following description in a case where there is no need to distinguish the I3C slaves 13-1 to 13-3 from each other. The blocks of the I3C slaves 13 are also similar to each other.

The data signal line 14-1 and the clock signal line 14-2 are used for signal transmission between the I3C master 12 and the I3C slave 13. In the bus IF 11, for example, pieces of serial data (SDA) are sequentially transmitted one-bit-at-a-time via the data signal line 14-1, and serial clocks (SCL) each having a predetermined frequency are transmitted via the clock signal line 14-2.

The I3C master 12 includes a data transmission unit 21, a data reception unit 22, a command transmission unit 23, a mode control unit 24, and a transmission/reception control unit 25, and these blocks each include circuits, modules, and other components.

The data transmission unit 21 transmits data to the I3C slave 13 via the data signal line 14-1 and the clock signal line 14-2. For example, the data transmission unit 21 can transmit the data to the I3C slave 13 by driving the data signal line 14-1 (switching a potential between a high level and a low level), in synchronization with a timing of a serial clock that is transmitted from the clock signal line 14-2 being driven.

The data reception unit 22 receives data that is transmitted from the I3C slave 13 via the data signal line 14-1 and the clock signal line 14-2. For example, the data reception unit 22 can receive, in synchronization with a timing of a serial clock from the clock signal line 14-2, the data that is transmitted from the I3C slave 13 when the I3C slave 13 drives the data signal line 14-1.

The command transmission unit 23 transmits, like the data transmission unit 21, various commands to the I3C slave 13 via the data signal line 14-1 and the clock signal line 14-2. The various commands are described later.

The mode control unit 24 selects any of a plurality of transfer modes defined by the I3C standard in response to a request from an upper layer (for example, a CCI layer processing unit 42 of FIG. 2 described later), and controls the transmission/reception control unit 25 to establish communication in the selected transfer mode.

In the bus IF 11, for example, an SDR (Standard Data Rate) mode in which data is transferred at a normal transfer rate and an HDR (High Data Rate) mode in which data is transferred at a transfer rate higher than that in the SDR mode are defined on the basis of the data transfer rate. Further, in the HDR mode, three transfer modes of a DDR (Double Data Rate) mode, a TSP (Ternary Symbol Pure-Bus) mode, and a TSL (Ternary Symbol Legacy-inclusive-Bus) mode are defined by the standard.

Thus, the mode control unit 24 selects any of the SDR mode, the DDR mode, the TSP mode, and the TSL mode, and controls the transmission/reception control unit 25 to establish communication in the selected transfer mode.

The transmission/reception control unit 25 controls, in response to a request from the upper layer, transmission/reception of data by the data transmission unit 21 and the data reception unit 22 and command transmission by the command transmission unit 23, for example, in a transfer mode selected by the mode control unit 24.

The I3C master 12 is configured in this way, and can switch the transfer mode as needed to, for example, control the data transmission unit 21 to transmit data to be written to a register or control the data reception unit 22 to receive data read out from the register.

The I3C slave 13 includes a data transmission unit 31, a data reception unit 32, a command interpretation unit 33, a mode control unit 34, and a transmission/reception control unit 35, and these blocks each include circuits, modules, and other components.

The data transmission unit 31 transmits data to the I3C master 12 via the data signal line 14-1 and the clock signal line 14-2. For example, the data transmission unit 31 can transmit the data to the I3C master 12 by driving the data signal line 14-1, in synchronization with a timing of a serial clock from the clock signal line 14-2 being driven by the I3C master 12.

The data reception unit 32 receives data that is transmitted from the I3C master 12 via the data signal line 14-1 and the clock signal line 14-2. For example, the data reception unit 32 can receive, in synchronization with a timing of a serial clock from the clock signal line 14-2, the data that is transmitted from the I3C master 12 when the I3C master 12 drives the data signal line 14-1.

The command interpretation unit 33 receives a command that is transmitted from the command transmission unit 23 of the I3C master 12 via the data signal line 14-1 and the clock signal line 14-2, and interprets the command, to thereby perform various processing processes based on an instruction by the command. In a case where the command interpretation unit 33 receives a command that is an instruction to start communication in the HDR mode, for example, the command interpretation unit 33 performs processing for notifying the mode control unit 34 that communication in the HDR mode is to be started. Further, in a case where the command interpretation unit 33 receives a command that is an instruction to write data or a command that is an instruction to read out data, the command interpretation unit 33 performs processing for notifying the transmission/reception control unit 35 that writing or read out of data is to be performed.

The mode control unit 34 selects, like the mode control unit 24 of the I3C master 12, any of the SDR mode, the DDR mode, the TSP mode, and the TSL mode on the basis of an instruction by a command that the command interpretation unit 33 has received. Then, the mode control unit 34 controls the transmission/reception control unit 25 to establish communication in the selected transfer mode.

The transmission/reception control unit 35 controls, on the basis of a command that the command interpretation unit 33 has received, transmission/reception of data by the data transmission unit 31 and the data reception unit 32 in a transfer mode selected by the mode control unit 24.

The I3C slave 13 is configured in this way, and can switch the transfer mode depending on control by the I3C master 12 to, for example, control the data transmission unit 31 to transmit data read out from a register or control the data reception unit 32 to receive data to be written to the register.

The I3C master 12 and I3C slave 13 configured as described above are mounted on a system controller and a controlled device, respectively, and can execute processing in physical layers in communication between the system controller and the controlled device.

Figure 2:
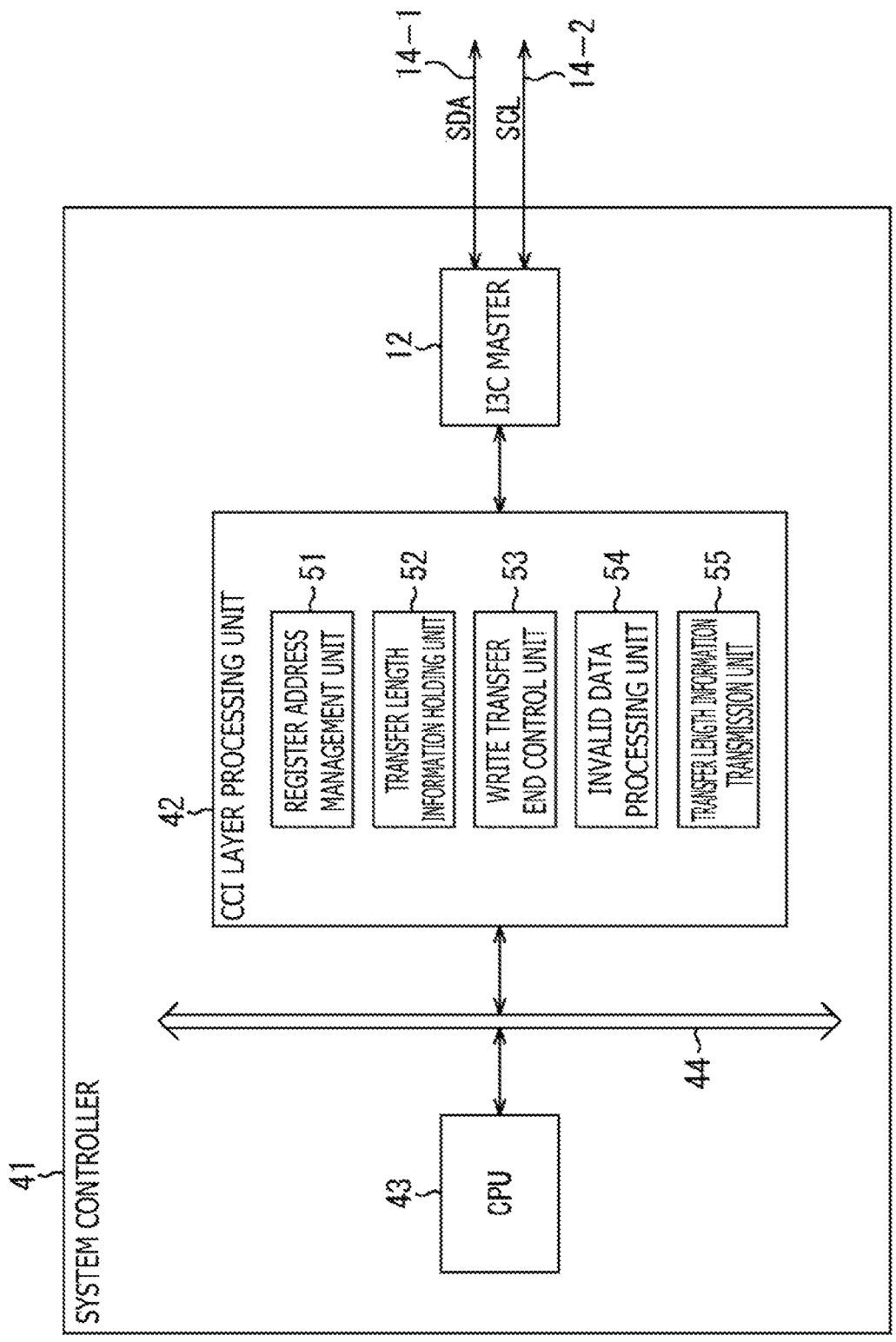
FIG. 2 is a block diagram illustrating a configuration example of a system controller having mounted thereon an I3C master.

FIG. 2 is a block diagram illustrating a configuration example of the system controller having mounted thereon the I3C master 12 of FIG. 1.

A system controller 41 illustrated in FIG. 2 includes, in addition to the I3C master 12 connected to the data signal line 14-1 and the clock signal line 14-2, the CCI layer processing unit 42, a CPU 43, and an internal bus 44. Further, as illustrated in FIG. 2, the I3C master 12 is connected to the CCI layer processing unit 42 configured to perform upper processing of the I3C master 12, and the CCI layer processing unit 42 is connected, via the internal bus 44, to the CPU 43 configured to perform control of the entire system controller 41.

The CCI layer processing unit 42 includes a register address management unit 51, a transfer length information holding unit 52, a write transfer end control unit 53, an invalid data processing unit 54, and a transfer length information transmission unit 55.

The register address management unit 51 manages an address of each register connected to the bus IF 11 of FIG. 1.

The transfer length information holding unit 52 holds transfer length information (Length) indicating a data length (number of bytes) of data to be transferred in data transfer to/from the I3C slave 13.

The write transfer end control unit 53 performs control for ending write transfer of writing, to the register, data transferred from the I3C master 12 to the I3C slave 13.

The invalid data processing unit 54 performs processing for adding or deleting dummy data that is used in odd-byte data transfer in the HDR mode in which one word that is the minimum unit in data transfer is defined as 2 bytes (16 bits), for example.

The transfer length information transmission unit 55 transmits transfer length information held by the transfer length information holding unit 52 to the I3C slave 13 via the I3C master 12.

Figure 3:
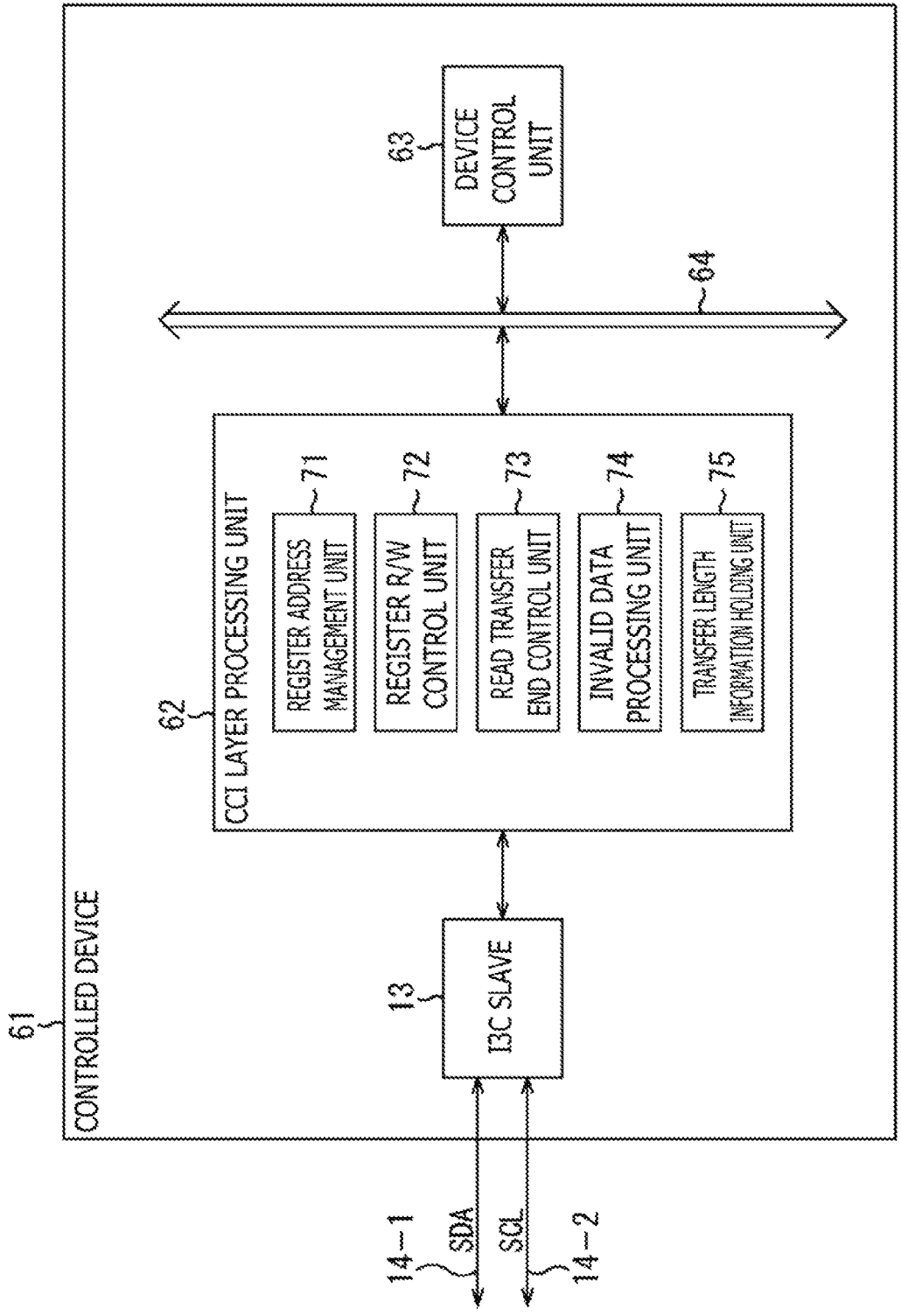
FIG. 3 is a block diagram illustrating a configuration example of a controlled device having mounted thereon an I3C slave.

FIG. 3 is a block diagram illustrating a configuration example of the controlled device having mounted thereon the I3C slave 13 of FIG. 1.

A controlled device 61 illustrated in FIG. 3 includes, in addition to the I3C slave 13 connected to the data signal line 14-1 and the clock signal line 14-2, a CCI layer processing unit 62, a device control unit 63, and an internal bus 64. Further, as illustrated in FIG. 3, the I3C slave 13 is connected to the CCI layer processing unit 62 configured to perform upper processing of the I3C slave 13, and the CCI layer processing unit 62 is connected, via the internal bus 64, to the device control unit 63 configured to perform control of the entire controlled device 61.

The CCI layer processing unit 62 includes a register address management unit 71, a register R/W (Read/Write) control unit 72, a read transfer end control unit 73, an invalid data processing unit 74, and a transfer length information holding unit 75.

The register address management unit 71 manages an address of a register that the controlled device 61 includes.

The register R/W control unit 72 performs control for writing, to the register, data that is transferred from the I3C master 12 to the I3C slave 13 and control for reading out, from the register, data that is transmitted from the I3C slave 13 to the I3C master 12.

The read transfer end control unit 73 performs control for ending read transfer of transferring, from the I3C slave 13 to the I3C master 12, data read out from the register.

The invalid data processing unit 74 performs processing for adding or deleting invalid data that is used in odd-byte data transfer in the HDR mode.

The transfer length information holding unit 75 holds transfer length information (Length) that is transmitted from the I3C master 12 in data transfer to/from the I3C master 12.

The device control unit 63 performs control for writing data that the I3C slave 13 has received to a state register under the control by the register R/W control unit 72 of the CCI layer processing unit 62, for example. Further, the device control unit 63 performs control for reading out, from the state register, data that the I3C slave 13 is to transmit, for example, and the data is transmitted under the control by the register R/W control unit 72 of the CCI layer processing unit 62.

In the system controller 41 and controlled device 61 configured as described above, for example, data to be written to the register can be transferred from the system controller 41 to the controlled device 61 or data read out from the register can be transferred from the controlled device 61 to the system controller 41.

<First Processing Example of Data Transfer>

Figure 4:
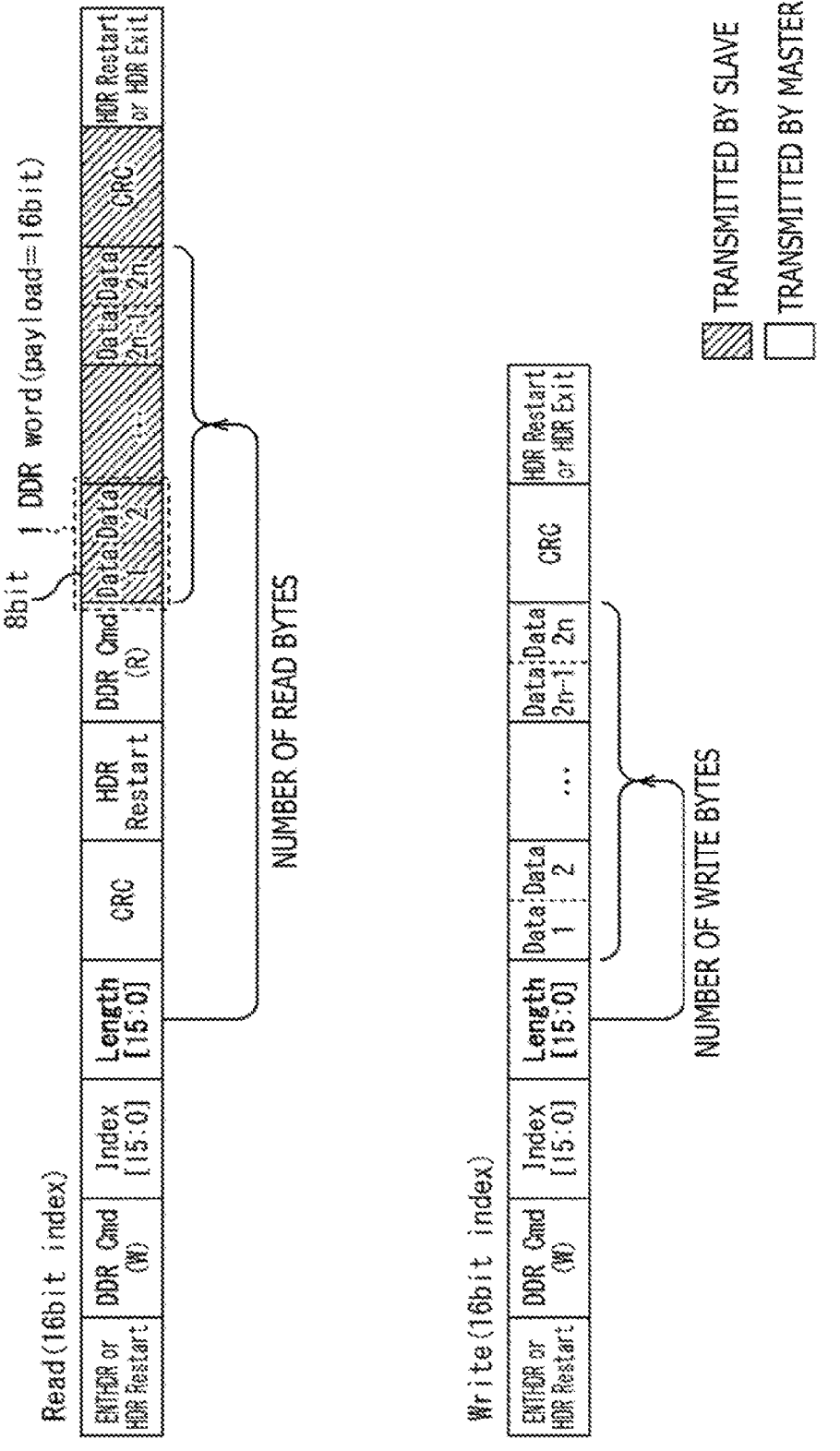
FIG. 4 is a diagram illustrating a format in a DDR mode.
Figure 6:
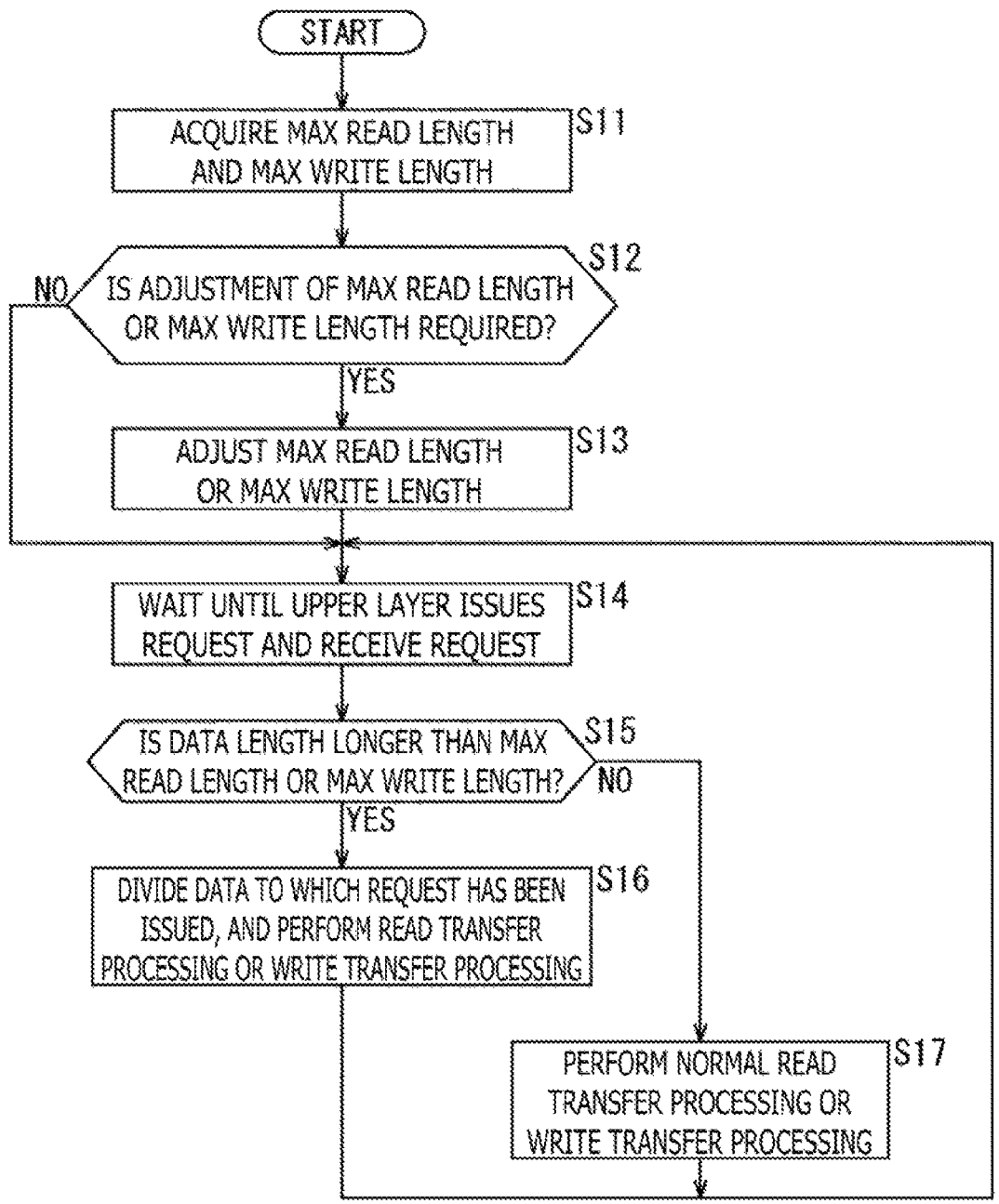
FIG. 6 is a flowchart illustrating processing that is performed in the I3C master.

With reference to FIG. 4 to FIG. 6, an example of first data transfer processing for transferring data in the bus IF 11 is described.

FIG. 4 illustrates a format of a signal that is transmitted and received between the I3C master 12 and the I3C slave 13 in a case where the transfer mode is the DDR mode. The upper part of FIG. 4 illustrates a format in the case of read transfer processing for transferring, from the I3C slave 13 to the I3C master 12, data read out from the register. The lower part of FIG. 4 illustrates a format in the case of write transfer processing for transferring, from the I3C master 12 to the I3C slave 13, data to be written to the register.

In the case where the read transfer processing is performed, first, the I3C master 12 transmits a command (ENTHDR or HDR_Restart) that is an instruction to start or restart communication in the HDR mode. Subsequently, the I3C master 12 transmits a write command (DDR_Cmd(W)) that is an instruction to perform writing for notifying the I3C slave 13 of a data length of data that is read out from the register to be transferred. Then, the I3C master 12 transmits, subsequently to the write command, an index (Index) for notifying an initial address from which read out of the data is started, transfer length information (Length) indicating the data length of the data to be transferred, and a CRC (Cyclic Redundancy Check) word. After that, the I3C master 12 transmits a command (HDR_Restart) that is an instruction to restart communication in the HDR mode, and transmits a read command (DDR_Cmd(R)) that is an instruction to read out the data.

In response to this, the I3C slave 13 transfers one word (16 bits) of the data at a time in the DDR mode in order from the beginning of the address based on the index, and transmits a CRC word when finishing transmission of data corresponding to the number of read bytes based on the transfer length information. After that, the I3C master 12 transmits a command (HDR_Restart or HDR_Exit) that is an instruction to restart or end communication in the HDR mode.

In the case where the write transfer processing is performed, first, the I3C master 12 transmits a command (ENTHDR or HDR_Restart) that is an instruction to start or restart communication in the HDR mode. Subsequently, the I3C master 12 transmits a write command (DDR_Cmd(W)) that is an instruction to write data, an index (Index) for notifying an initial address from which writing of the data is started, and transfer length information (Length) indicating a data length of the data to be transferred. Then, the I3C master 12 transfers one word (16 bits) of the data at a time in the DDR mode in order from the beginning of the address based on the index, and transmits a CRC word when finishing transmission of data corresponding to the number of write bytes based on the transfer length information. After that, the I3C master 12 transmits a command (HDR_Restart or HDR_Exit) that is an instruction to restart or end communication in the HDR mode.

FIG. 5 illustrates a format of a signal that is transmitted and received between the I3C master 12 and the I3C slave 13 in a case where the transfer mode is the TSL mode or the TSP mode. The upper part of FIG. 5 illustrates a format in the case of the read transfer processing for transferring, from the I3C slave 13 to the I3C master 12, data read out from the register. The lower part of FIG. 5 illustrates a format in the case of the write transfer processing for transferring, from the I3C master 12 to the I3C slave 13, data to be written to the register.

Here, the format in the TSL mode or the TSP mode is a format that is different from that in the DDR mode in that transmission of a CRC word, which is illustrated in FIG. 4, is not performed, and is similar to that in the DDR mode in the remaining points.

In this way, in the first data transfer processing, when data is transferred, transfer length information is transmitted from the I3C slave 13 to the I3C master 12. Then, the transfer length information is held by the transfer length information holding unit 52 of the CCI layer processing unit 42 on the system controller 41 side, and is held by the transfer length information holding unit 75 of the CCI layer processing unit 62 on the controlled device 61 side.

With this, for example, in a case where a data length of data requested to be transferred is an odd number of bytes, even when dummy data of 1 byte is added to the data and the resultant is transferred, the dummy data can be recognized to be discarded on the basis of the transfer length information. With this, even when one word that is the minimum unit in data transfer is 2 bytes (16 bits), data of an odd number of bytes can be reliably transferred.

Incidentally, in the I3C, the upper limit of the number of bytes transferable per read transfer (hereinafter referred to as "max read length (MRL)") is defined. In a similar manner, in the I3C, the upper limit of the number of bytes transferable per write transfer (hereinafter referred to as "max write length (MWL)") is defined. The max read length and the max write length are generally set to fixed values in a design stage in view of how the controlled device 61 is mounted. Alternatively, the max read length and the max write length can be variables in a case where the values share a resource with other values, for example.

In a case where a data length of data to which a data transfer request has been issued from the CCI layer processing unit 42 is longer than the max read length or the max write length, for example, the I3C master 12 performs control for dividing the data to have a data length equal to or shorter than the max read length or the max write length and transferring the resultant.

FIG. 6 is a flowchart illustrating processing that is performed in the I3C master 12.

In Step S11, the I3C master 12 transmits, to each of the I3C slaves 13 connected to the bus IF 11, a command (GETMWL/MRL) for instructing each of the I3C slaves 13 to transmit the max read length and the max write length. Then, the I3C master 12 acquires the max read length and the max write length that are transmitted from each of the I3C slaves 13 in response to the command.

In Step S12, the I3C master 12 determines whether or not adjustment of the max read length or max write length of each of the I3C slaves 13, which has been acquired in Step S11, is required. For example, the I3C master 12 compares a data length of data to which a data transfer request is supposed to be issued from the CCI layer processing unit 42 and the max read length and max write length of the I3C slave 13 to each other. Then, in a case where at least one of the max read length and max write length of the I3C slave 13 is equal to or shorter than the data length of the data supposed to be transferred, the I3C master 12 determines that adjustment of the max read length or max write length that is equal to or shorter than the data length of the data supposed to be transferred is required. Further, for example, the I3C master 12 may use, in comparison, the max read length and max write length of the I3C master 12 itself as the data length of the data supposed to be transferred.

In a case where the I3C master 12 determines, in Step S12, that adjustment of the max read length or max write length of the I3C slave 13 is required, the processing proceeds to Step S13.

In Step S13, the I3C master 12 adjusts the max read length or max write length of the I3C slave 13 to which the necessity of adjustment has been determined, and transmits, to the I3C slave 13, a command (SETMWL/MRL) for setting the adjusted max read length and max write length. For example, the I3C master 12 adjusts the max read length or max write length of the I3C slave 13 that is equal to or shorter than the data length of the data to which the data transfer request is supposed to be issued from the CCI layer processing unit 42 so that the max read length or the max write length matches the data length of the data supposed to be transferred. Further, for example, the I3C master 12 may adjust the max read length or max write length of the I3C slave 13 so that the max read length or the max write length matches the max read length and max write length of the I3C master 12 itself.

After the processing in Step S13 or in a case where it is determined, in Step S12, that adjustment of the max read length or max write length of the I3C slave 13 is not required, the processing proceeds to Step S14.

In Step S14, the I3C master 12 waits until the CCI layer processing unit 42, which is an upper layer, requests data transfer, and receives a data transfer request issued.

In Step S15, the I3C master 12 determines whether or not a data length of data to which the data transfer request has been issued from the CCI layer processing unit 42 in Step S14 is longer than the max read length or max write length of the I3C slave 13 that is a target of data transfer. In the case where the max read length or max write length of the I3C slave 13 has been adjusted in Step S13, for example, a determination is made on the basis of the adjusted max read length or max write length.

In a case where the I3C master 12 determines, in Step S15, that the data length of the data to which the data transfer request has been issued is longer than the max read length or max write length of the I3C slave 13 that is the target of data transfer, the processing proceeds to Step S16. In Step S16, the I3C master 12 divides the data to which the data transfer request has been issued to have a length equal to or shorter than the max read length or max write length of the I3C slave 13 that is the target of data transfer, and performs the read transfer processing or the write transfer processing.

In contrast, in a case where the I3C master 12 determines, in Step S15, that the data length of the data to which the data transfer request has been issued is not longer than the max read length or max write length of the I3C slave 13 that is the target of data transfer (the data has a length equal to or shorter than the max read length or the max write length), the processing proceeds to Step S17. In Step S17, the I3C master 12 performs the normal read transfer processing or write transfer processing without data division.

After the processing in Step S16 or S17, the processing returns to Step S14 where the I3C master 12 waits until the CCI layer processing unit 42, which is the upper layer, requests data transfer. A similar processing is repeatedly performed thereafter.

In this way, in the case where a data transfer request is issued to data longer than the max read length or max write length set to the I3C slave 13, the I3C master 12 can divide and transfer the data.

That is, in the system controller 41, the I3C master 12 can acquire the max read length and max write length of the I3C slave 13, and control transmission/reception of data by the transmission/reception control unit 25 so that data to be transferred in one data transfer has a data length equal to or shorter than the max read length and the max write length in data transfer to/from the I3C slave 13. Then, in the system controller 41, the CCI layer processing unit 42 can set a data length equal to or shorter than the max read length and the max write length to transfer length information indicating the data length of the data to be transferred, and the I3C master 12 can transmit the transfer length information to the I3C slave 13 prior to data transfer of the data.

When the normal read transfer processing or write transfer processing is performed in Step S17, for example, the I3C slave 13 performs transfer of data set not to exceed the max read length and the max write length by the CCI layer processing unit 42.

Further, when the data is divided to have a length equal to or shorter than the max read length or the max write length and the read transfer processing or the write transfer processing is performed in Step S16, the I3C slave 13 transfers the data by transmitting the data through a plurality of transmissions. At this time, the I3C slave 13 can transmit transfer length information in each data transfer, for example. Alternatively, as described later, the I3C slave 13 can transmit transfer length information indicating a data length of entire data requested to be transferred only once when performing the read transfer processing, and in this case, overhead can be reduced and a reduction in transfer efficiency can thus be avoided.

Incidentally, there is assumed a case where some I3C slaves 13 do not support commands (GETMRL and GETMWL) that are instructions to transmit the max read length and the max write length. Alternatively, there is assumed a case where the I3C master 12 unintentionally sets a length exceeding the max read length or the max write length to transfer length information.

Such cases result in a situation where when data having a data length longer than the max write length is written, a FIFO (First In, First Out) overflow occurs on the I3C slave 13 side.

As a first measure to such a situation, the I3C slave 13 normally writes data until a FIFO overflow occurs, and discards all data after the FIFO overflow has occurred. The I3C slave 13 then sets an error flag (over MWL error) indicating the occurrence of the error of the FIFO overflow, and holds the error flag until the error flag is cleared. Then, the I3C slave 13 ignores all signals until receiving a next HDR end command or HDR restart command (HDR_Exit or HDR_Restart).

Further, as a second measure, the I3C slave 13 performs, when data reaches the max write length, processing (Slave Abort) for interrupting communication from the I3C slave 13 side. In response to this, the I3C master 12 can stop communication, and can stop data transfer with an HDR end command (HDR_Exit) or issue an HDR restart command (HDR_Restart) to continue transfer of remaining data.

Further, as a third measure, the I3C slave 13 can recognize that data exceeds the max write length at a time of receiving transfer length information, and thus performs the processing (Slave Abort) for interrupting communication from the I3C slave 13 side immediately after receiving the transfer length information. In response to this, the I3C master 12 can stop communication, and can stop data transfer with an HDR end command (HDR_Exit) or issue an HDR restart command (HDR_Restart) to continue transfer of remaining data.

In addition, measures are required to be taken when data having a data length longer than the max read length is read out.

For example, as a first measure, in view of a fact that it is difficult to transfer all data, the I3C slave 13 sends a NACK immediately after receiving a read command to end communication. Then, the I3C slave 13 sets an error flag (over MRL error) indicating the occurrence of an error due to an instruction to read out data having a data length longer than the max read length, and holds the error flag until the error flag is cleared.

Further, as a second measure, the I3C slave 13 transfers data to the I3C master 12 until the data reaches the upper limit of the max read length. Then, the I3C slave 13 sets an error flag (over MRL error) at a time when the data reaches the max read length. The I3C slave 13 sends a CRC word that is an end packet to the I3C master 12 in the DDR mode, and the I3C slave 13 stops driving of the data signal line 14-1 and the clock signal line 14-2 to release the bus in the TSP/TSL mode.

Meanwhile, in the case of the DDR mode, the I3C master 12 recognizes that the I3C slave 13 has the error (over MRL error) when receiving the CRC word, before the data reaches the data length indicated by the transfer length information. Then, the I3C master 12 receives data up to that time if no CRC error has occurred.

Further, in the case of the TSL/TSP mode, the I3C master 12 recognizes that the I3C slave 13 has the error (over MRL error) when detecting a state in which the data signal line 14-1 and the clock signal line 14-2 are not driven (toggled), before the data reaches the data length indicated by the transfer length information.

Then, in either the DDR mode or the TSL/TSP mode, after recognizing that the I3C slave 13 has the error (over MRL error), the I3C master 12 transmits data again to perform HDR read processing with a data length not exceeding the max read length.

<Second Processing Example of Data Transfer>

With reference to FIG. 7 to FIG. 25, second data transfer processing for transferring data in the bus IF 11 is more specifically described.

Figure 7:
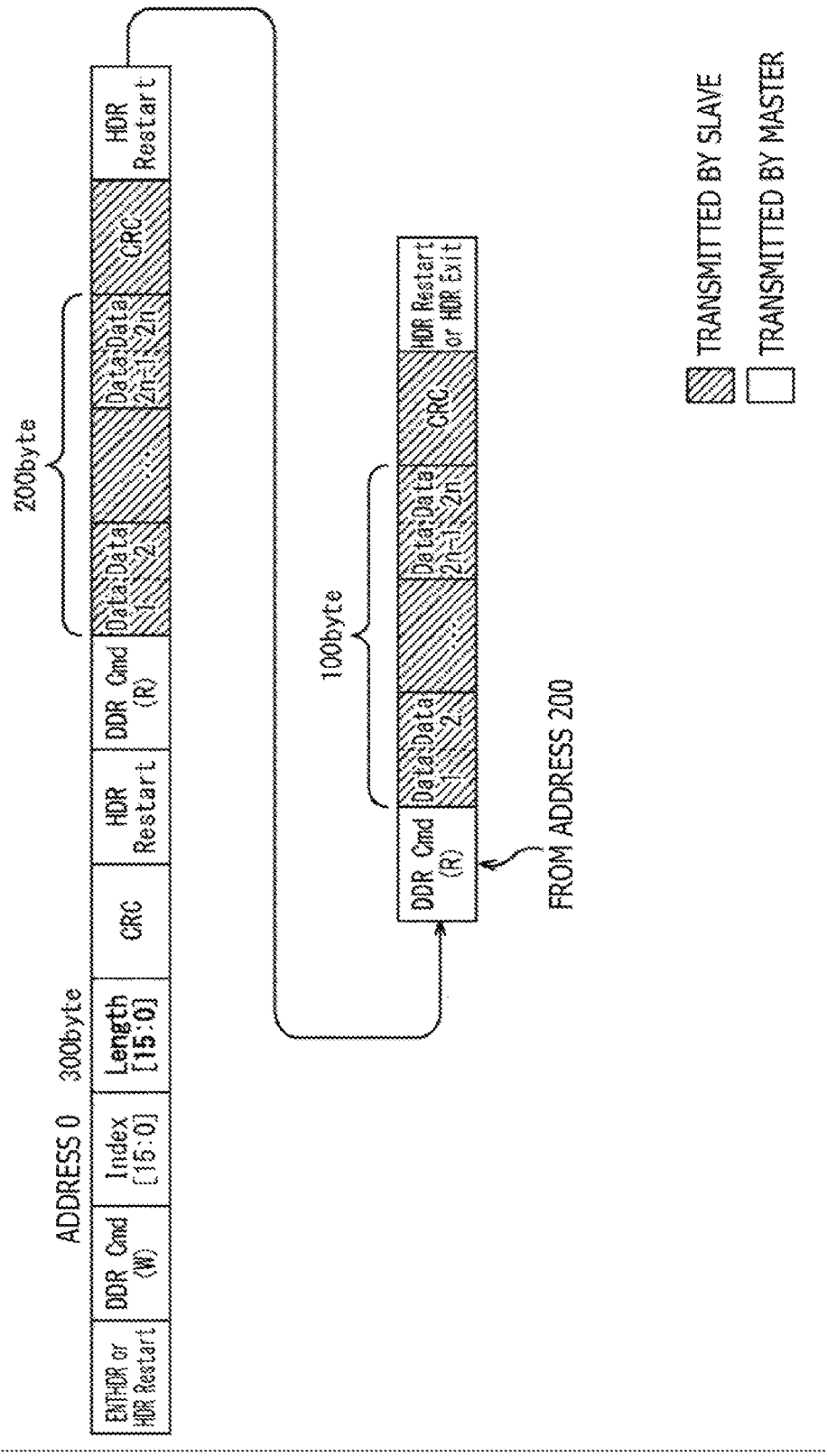
FIG. 7 is a diagram illustrating a format in read transfer processing for dividing and transferring data in the DDR mode.

FIG. 7 illustrates a format in read transfer processing for dividing and transferring data exceeding the max read length to read out the data from the I3C slave 13 to the I3C master 12 in the case where the transfer mode is the DDR mode. Note that, FIG. 7 illustrates an example in which data of 300 bytes is requested to be transferred when the max read length is 200 bytes.

The I3C master 12 first transmits a command (ENTHDR or HDR_Restart) that is an instruction to start or restart communication in the HDR mode. Subsequently, the I3C master 12 transmits a write command (DDR_Cmd(W)) that is an instruction to perform writing for notifying the I3C slave 13 of a data length of data that is read out from the register to be transferred.

Then, the I3C master 12 transmits, subsequently to the write command, an index (Index) for notifying an initial address from which read out of the data is started, transfer length information (Length) indicating the data length of the data to be transferred, and a CRC word. After that, the I3C master 12 transmits a command (HDR_Restart) that is an instruction to restart communication in the HDR mode, and transmits a read command (DDR_Cmd(R)) that is an instruction to read out the data. In the example illustrated in FIG. 7, the initial address from which read out of the data is started is an address 0, the data length of the data to be transferred is 300 bytes, and the data is divided into 200 bytes, which is the max read length, to be transferred.

In response to this, the I3C slave 13 transfers one word (16 bits) of the data at a time in the DDR mode in order from the address 0 on the basis of the index, and transmits a CRC word when finishing transmission of the data of 200 bytes, which is the max read length.

After that, the I3C master 12 transmits a command (HDR_Restart) that is an instruction to restart communication in the HDR mode, and subsequently transmits a read command (DDR_Cmd(R)) that is an instruction to read out the data.

At this time, the I3C slave 13 can recognize that the data of 200 bytes of 300 bytes indicated by the transfer length information has been already transmitted, and hence a subsequent initial address is an address 200 and the remaining data of 100 bytes is required to be transmitted. Thus, the I3C slave 13 transfers one word (16 bits) of the data at a time in the DDR mode in order from the address 200, and transmits a CRC word after finishing transmission of the data of 100 bytes.

With this, the data of 300 bytes requested to be transferred is read out, and the I3C master 12 transmits a command (HDR_Restart or HDR_Exit) that is an instruction to restart or end communication in the HDR mode.

As described above, when performing the read transfer processing, the I3C master 12 transmits an index and transfer length information before reading out data from the I3C slave 13, to thereby notify the I3C slave 13 of an initial address from which read out of the data is started and a data length of the data to be transferred as described above with reference to FIG. 4. Here, in the case of dividing and reading out data exceeding the max read length, for example, the I3C master 12 first transmits an index and transfer length information regarding the entire data.

With this, even when the I3C master 12 does not transmit index and transfer length information of each of pieces of data that are successively read out, the I3C slave 13 can update a remaining transmission amount in each data transmission, to thereby recognize the index and data length of each of the pieces of data that are successively read out.

With this, index and transfer length information of each of pieces of data that are successively transferred are not necessarily transmitted, and overhead can thus be reduced, with the result that the data transfer efficiency can be improved.

Figure 8:
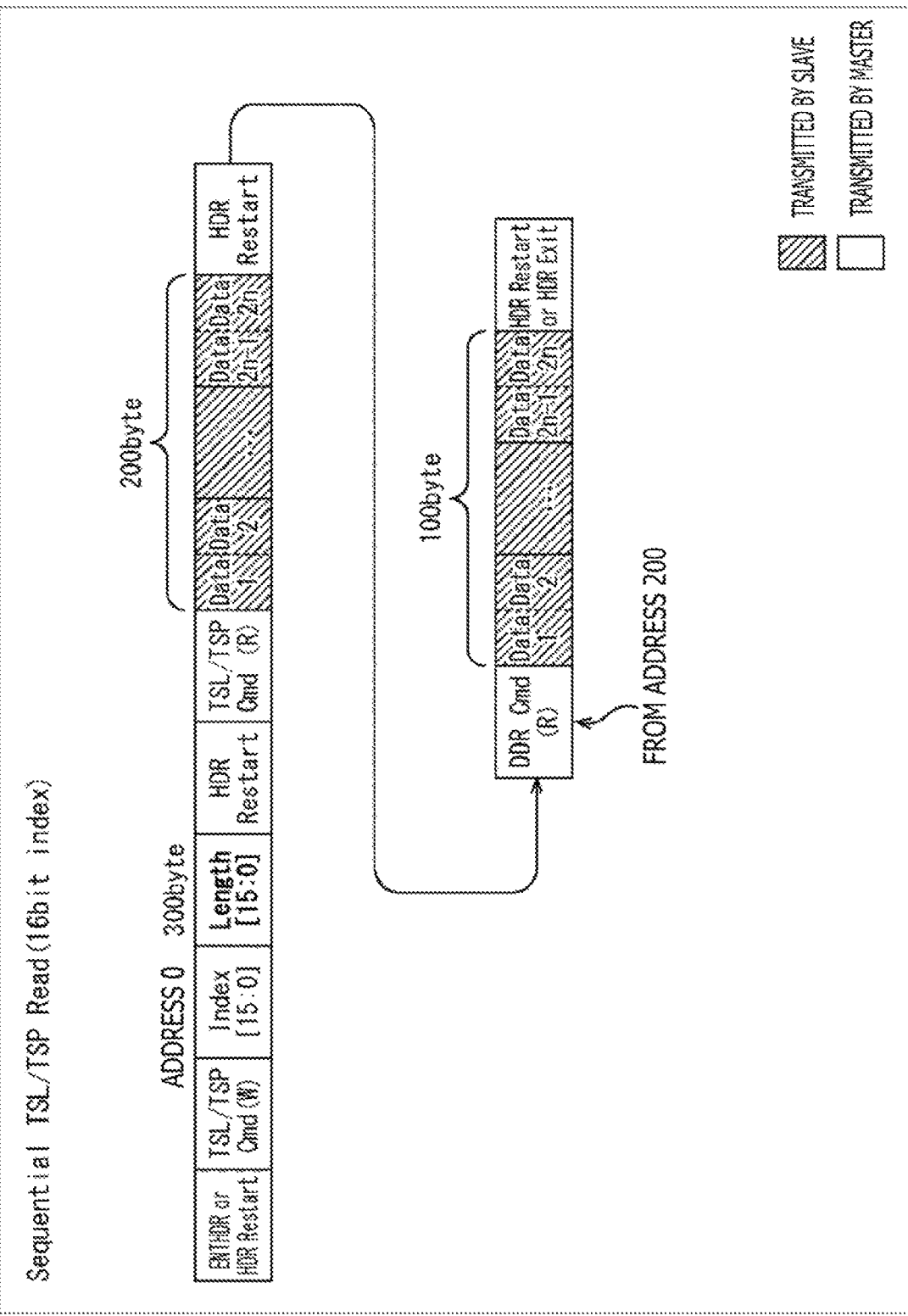
FIG. 8 is a diagram illustrating a format in read transfer processing for dividing and transferring data in the TSL/TSP mode.

FIG. 8 illustrates a format in read transfer processing for dividing and transferring data exceeding the max read length to read out the data from the I3C slave 13 to the I3C master 12 in the case where the transfer mode is the TSL mode or the TSP mode. Note that, FIG. 8 illustrates an example in which data of 300 bytes is transferred when the max read length is 200 bytes as in FIG. 7.

Here, the format in the TSL mode or the TSP mode is a format that is different from that in the DDR mode in that transmission of a CRC word, which is illustrated in FIG. 7, is not performed, and is similar to that in the DDR mode in the remaining points. That is, in the TSL mode or the TSP mode, the data transfer efficiency can be improved as in the DDR mode.

<Data Transfer Processing in System Controller>

With reference to the flowcharts of FIG. 9 to FIG. 17, data transfer processing that is executed in the system controller 41 is described.

In Step S21, the I3C master 12 performs an initial setting process based on each of the I3C slaves 13 connected to the bus IF 11 (for example, the processing in Steps S11 to S13 of FIG. 6 described above).

In Step S22, the CCI layer processing unit 42 waits until the CPU 43, which is an upper layer, requests data transfer, and receives a data transfer request issued.

In Step S23, the CCI layer processing unit 42 determines, on the basis of the data transfer request received in Step S22, whether the transfer mode for data transfer to/from the controlled device 61 is the DDR mode, the TSL/TSP mode, or the SDR mode.

In a case where the CCI layer processing unit 42 determines that the transfer mode is the DDR mode in Step S23, the processing proceeds to Step S24 where register R/W transfer processing in the DDR mode is performed as describer later with reference to FIG. 10 to FIG. 13.

Meanwhile, in a case where the CCI layer processing unit 42 determines that the transfer mode is the TSL/TSP mode in Step S23, the processing proceeds to Step S25 where register R/W transfer processing in the TSL/TSP mode is performed as described later with reference to FIG. 14 to FIG. 17.

Meanwhile, in a case where the CCI layer processing unit 42 determines that the transfer mode is the SDR mode in Step S23, the processing proceeds to Step S26 where the register R/W transfer is performed in the SDR mode. Note that, in the case where the register R/W transfer is performed in the SDR mode, transmission/reception of transfer length information as described above is not required.

After the processing in Step S24, Step S25, or Step S26, the processing returns to Step S22. In the system controller 41, a similar processing is repeatedly performed thereafter.

Next, with reference to FIG. 10 to FIG. 13, the register R/W transfer processing in the DDR mode (Step S24 of FIG. 9) that the system controller 41 executes is described.

Figure 10:
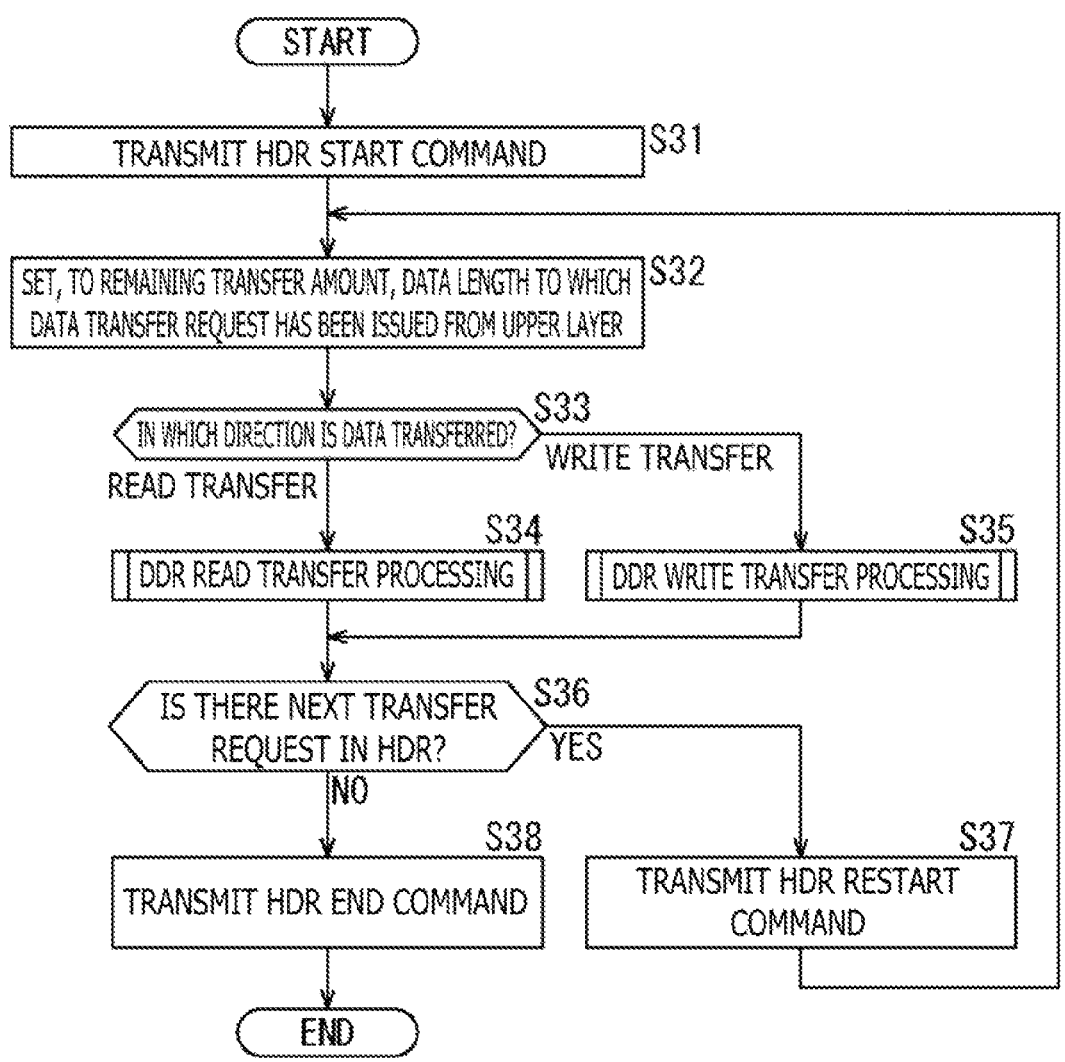
FIG. 10 is a flowchart illustrating register R/W transfer processing in the DDR mode.

FIG. 10 is a flowchart illustrating the register R/W transfer processing in the DDR mode.

In Step S31, in the I3C master 12, the command transmission unit 23 transmits, to all of the I3C slaves 13 connected to the bus IF 11, an HDR start command (ENTHDR0) for starting communication in the HDR mode to establish communication in the DDR mode.

Figure 9:
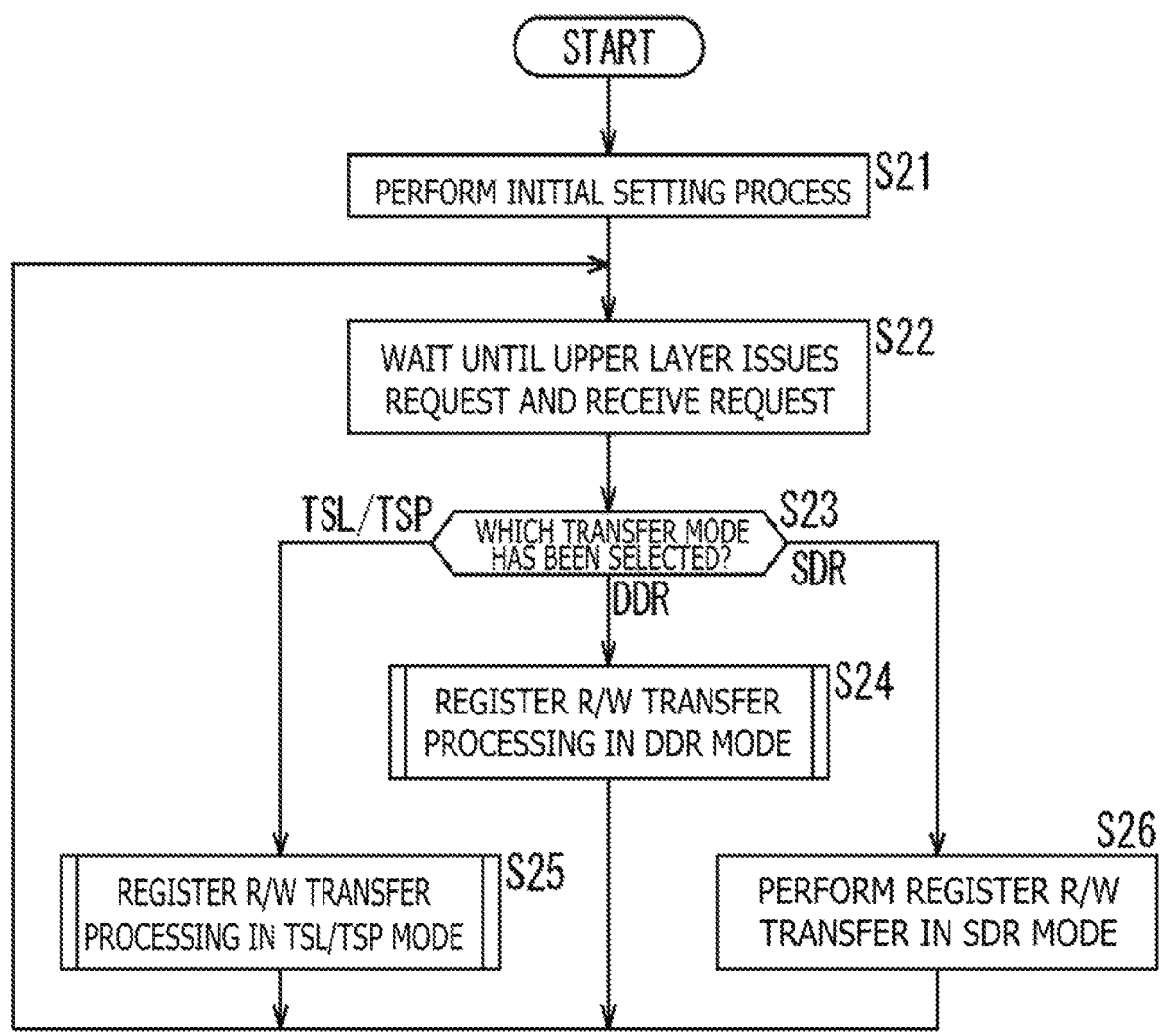
FIG. 9 is a flowchart illustrating data transfer processing that is executed in the system controller.

In Step S32, the CCI layer processing unit 42 sets, to a remaining transfer amount, a data length of data to which the data transfer request has been issued from the CPU 43, which is the upper layer, in Step S22 of FIG. 9. The remaining transfer amount indicates remaining data to be transferred to/from the controlled device 61.

In Step S33, the CCI layer processing unit 42 determines whether a transfer direction of the data requested by the CPU 43 is read transfer or write transfer.

In a case where the CCI layer processing unit 42 determines that the data transfer direction is the read transfer in Step S33, the processing proceeds to Step S34 where DDR read transfer processing is performed as described later with reference to FIG. 11.

In contrast, in a case where the CCI layer processing unit 42 determines that the data transfer direction is the write transfer in Step S33, the processing proceeds to Step S35 where DDR write transfer processing is performed as described later with reference to FIG. 13.

After the processing of the DDR read transfer processing in Step S34 or the DDR write transfer processing in Step S35, the processing proceeds to Step S36.

In Step S36, the CCI layer processing unit 42 determines whether or not the CPU 43, which is the upper layer, has issued a next HDR data transfer request.

In a case where the CCI layer processing unit 42 determines, in Step S36, that a next HDR data transfer request has been issued, the processing proceeds to Step S37. In Step S37, in the I3C master 12, the command transmission unit 23 transmits an HDR restart command that is an instruction to restart communication in the HDR mode. After that, the processing returns to Step S32. A similar processing is repeatedly performed thereafter.

In contrast, in a case where the CCI layer processing unit 42 determines, in Step S36, that a next HDR data transfer request has not been issued, the processing proceeds to Step S38.

In Step S38, in the I3C master 12, the command transmission unit 23 transmits a command that is an instruction to end communication in the HDR mode, and the register R/W transfer processing in the DDR mode is then ended. The processing returns to Step S22 of FIG. 9.

Figure 11:
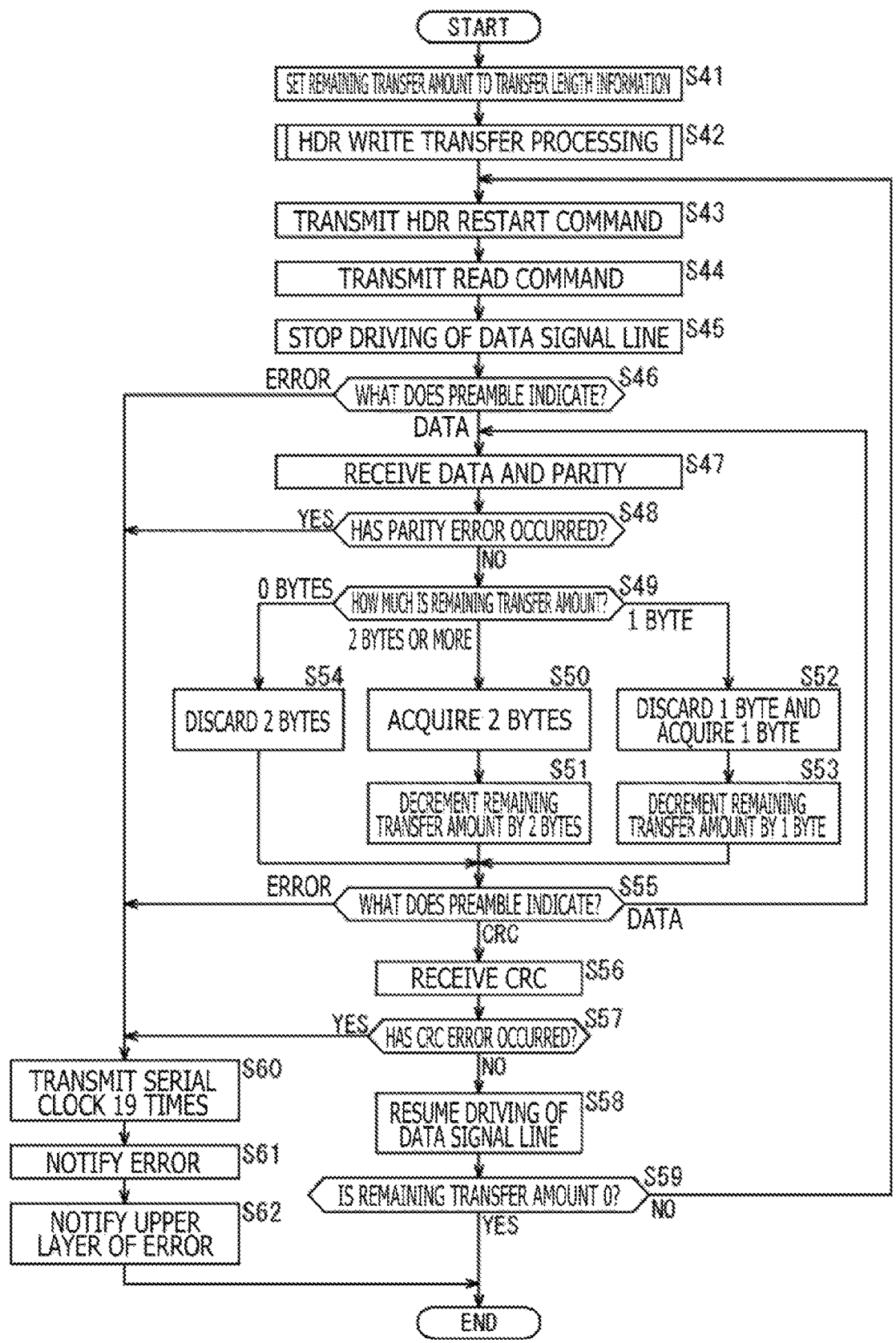
FIG. 11 is a flowchart illustrating DDR read transfer processing.

FIG. 11 is a flowchart illustrating the DDR read transfer processing that is performed in Step S34 of FIG. 10.

In Step S41, the CCI layer processing unit 42 sets the remaining transfer amount set in Step S32 of FIG. 10 to transfer length information indicating the data length of the data to be transmitted to the controlled device 61, and makes the transfer length information holding unit 52 hold the transfer length information.

In Step S42, the I3C master 12 performs HDR write transfer processing (see FIG. 12) for transmitting the transfer length information to the I3C slave 13, to thereby notify the I3C slave 13 of the data length of the data that is read out from the register to be transferred. After this processing, in the I3C master 12, the command transmission unit 23 transmits an HDR restart command in Step S43, and transmits a read command in Step S44.

In Step S45, the I3C master 12 stops driving of the data signal line 14-1 and starts signal reception by the data reception unit 22 when the I3C slave 13 drives the data signal line 14-1 to transmit a signal.

In Step S46, the I3C master 12 makes a determination based on a preamble of the signal that is transmitted from the I3C slave 13. In a case where the I3C master 12 determines, on the basis of the preamble, that data is to be transmitted from the I3C slave 13 in Step S46, the processing proceeds to Step S47.

In Step S47, in the I3C master 12, the data reception unit 22 receives the data and parity that are transmitted from the I3C slave 13.

In Step S48, the I3C master 12 determines, with the use of the parity received in Step S47, whether or not the data received in Step S47 has an error. Then, in a case where the I3C master 12 determines that no parity error has occurred, the processing proceeds to Step S49.

In Step S49, the CCI layer processing unit 42 determines whether a current remaining transfer amount is 2 bytes or more, 1 byte, or 0 bytes.

In a case where the CCI layer processing unit 42 determines that the current remaining transfer amount is 2 bytes or more in Step S49, the processing proceeds to Step S50. In Step S50, the CCI layer processing unit 42 acquires data of 2 bytes read out from the register to be transferred from the I3C slave 13 to the I3C master 12. The CCI layer processing unit 42 makes an update by decrementing the remaining transfer amount by 2 bytes in Step S51.

Meanwhile, in a case where the CCI layer processing unit 42 determines that the remaining transfer amount is 1 byte in Step S49, the processing proceeds to Step S52. In Step S52, in the CCI layer processing unit 42, dummy data of 1 byte of the data of 2 bytes transferred from the I3C slave 13 to the I3C master 12 is discarded by the invalid data processing unit 54, and the data of 1 byte read out from the register is acquired. After that, the I3C master 12 makes an update by decrementing the remaining transfer amount by 1 byte in Step S53.

Meanwhile, in a case where the CCI layer processing unit 42 determines that the remaining transfer amount is 0 bytes in Step S49, the processing proceeds to Step S54. That is, in this case, no data (0 bytes) is transferred from the I3C slave 13, and hence the CCI protocol is violated, with the result that the CCI layer processing unit 42 discards the data of 2 bytes that have been transferred from the I3C slave 13 to the I3C master 12.

After the processing in Step S51, Step S53, or Step S54, the processing proceeds to Step S55 where the I3C master 12 makes a determination based on a preamble of a signal that is transmitted from the I3C slave 13.

In a case where the I3C master 12 determines, on the basis of the preamble, that data is to be transmitted from the I3C slave 13 in Step S55, the processing returns to Step S47. A similar processing is repeatedly performed thereafter.

Meanwhile, in a case where the I3C master 12 determines, on the basis of the preamble, that a CRC word is to be transmitted in Step S55, the processing proceeds to Step S56 where the data reception unit 22 receives the CRC word. The I3C slave 13 transmits a CRC word, for example, in a case where the I3C slave 13 has transmitted all data requested to be transferred or a case where the I3C slave 13 has transmitted data corresponding to the max read length.

In Step S57, the I3C master 12 determines whether or not the CRC word that the data reception unit 22 has received in Step S56 has an error.

In a case where the I3C master 12 determines that the CRC word has no error in Step S57, the processing proceeds to Step S58 where driving of the data signal line 14-1 is resumed.

In Step S59, after the remaining transfer amount has been updated in Step S51 or S53, for example, the I3C master 12 determines whether or not the current remaining transfer amount is 0. In a case where the data having the data length indicated by the transfer length information, that is, all data requested to be transferred has been transmitted, for example, the current remaining transfer amount is 0. In contrast to this, for example, in a case where the data length indicated by the transfer length information is longer than the max read length and the data is divided to be transferred, a CRC word is sometimes transmitted even when all data requested to be transferred has not been transmitted, and the current remaining transfer amount is not 0 in such a case.

In a case where the I3C master 12 determines that the current remaining transfer amount is not 0 in Step S59, the processing returns to Step S43, and the processing from the processing for transmitting an HDR restart command is continuously performed.

In contrast, in a case where, for example, the I3C master 12 determines that a NACK response indicating that the I3C slave 13 had not been able to receive data or a command normally has been transmitted, or detects the occurrence of a framing error on the basis of the preamble in Step S46, the processing proceeds to Step S60. In a similar manner, in a case where the I3C master 12 determines that a parity error has occurred in Step S48, a case where the I3C master 12 detects a framing error in Step S55, or a case where the I3C master 12 determines that the CRC word has an error in Step S57, the processing proceeds to Step S60.

In Step S60, the I3C master 12 transmits serial clocks to the I3C slave 13 19 times.

Then, in Step S61, the I3C master 12 notifies the CCI layer processing unit 42 of the error. In Step S62, the CCI layer processing unit 42 notifies the CPU 43, which is the upper layer, of the error.

After the processing in Step S62 or in a case where it is determined that the current remaining transfer amount is 0 in Step S59, the DDR read transfer processing is ended, and the processing proceeds to Step S36 of FIG. 10.

Figure 12:
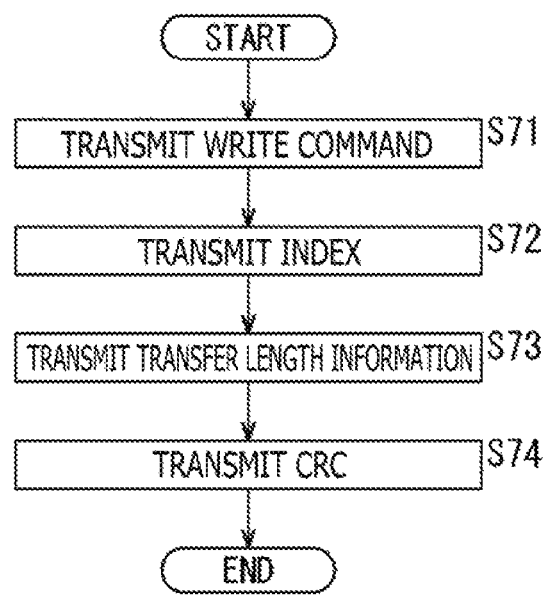
FIG. 12 is a flowchart illustrating HDR write transfer processing in the DDR mode.

FIG. 12 is a flowchart illustrating the HDR write transfer processing that is performed in Step S42 of FIG. 11.

In Step S71, the command transmission unit 23 transmits a write command to the I3C slave 13. In Step S72, the data transmission unit 21 transmits an index to the I3C slave 13.

In Step S73, the data transmission unit 21 transmits, to the I3C slave 13, the transfer length information based on the data transfer request received in Step S22 of FIG. 9. In Step S74, the data transmission unit 21 transmits a CRC word, and the HDR write transfer processing is then ended. The processing proceeds to Step S43 of FIG. 11.

Figure 13:
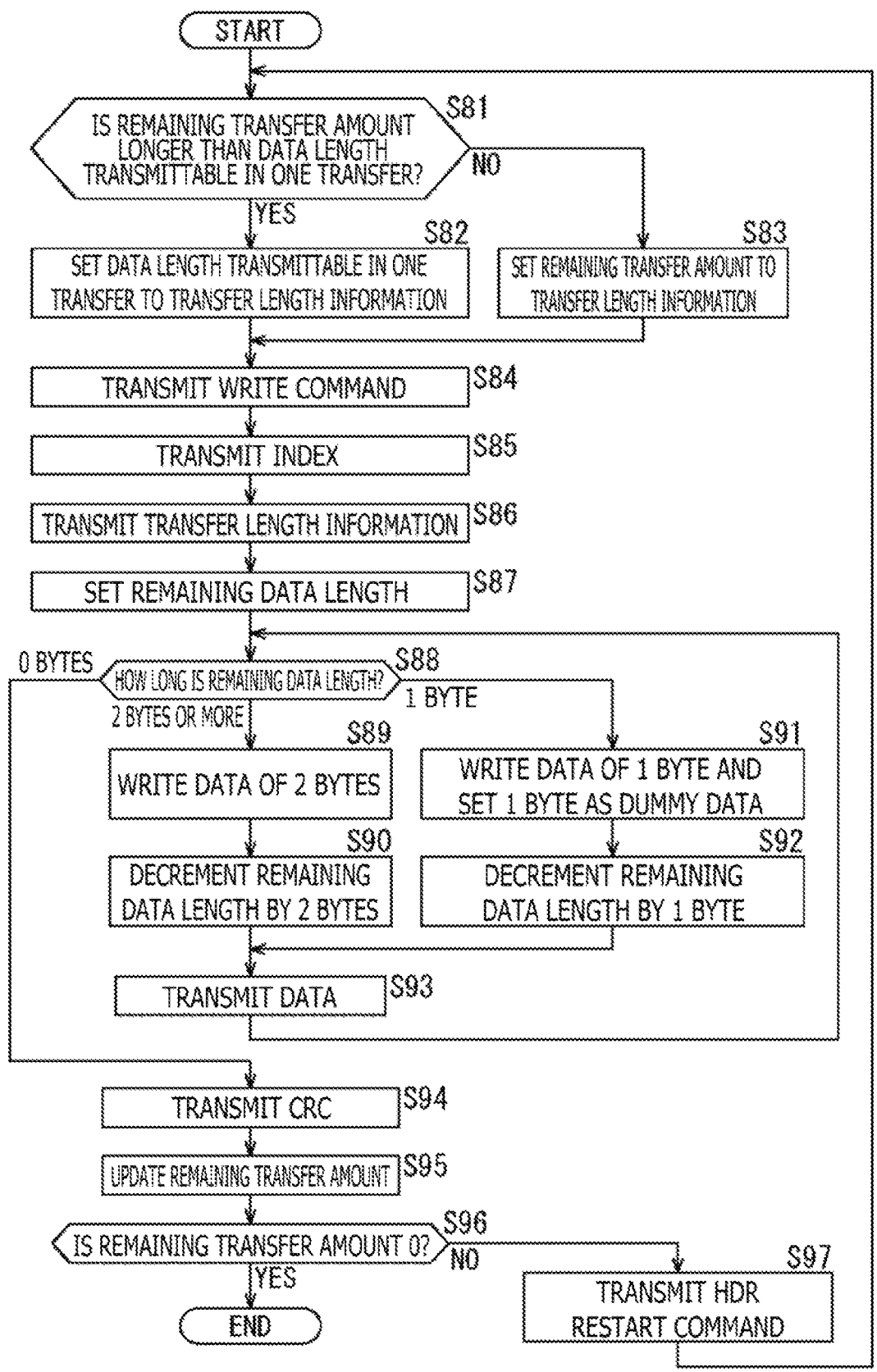
FIG. 13 is a flowchart illustrating DDR write transfer processing.

FIG. 13 is a flowchart illustrating the DDR write transfer processing that is performed in Step S35 of FIG. 10.

In Step S81, the CCI layer processing unit 42 of the system controller 41 determines whether or not a data length of the remaining transfer amount set in Step S32 of FIG. 10 is longer than a data length transmittable in one transfer. Here, the data length transmittable in one transfer is a value obtained by subtracting, from the max write length of the I3C slave 13 to which data is to be written, an index for notifying an initial address from which writing of the data is started and a data length of the data to be transferred (=MWL−Index−Length).

In a case where the CCI layer processing unit 42 determines, in Step S81, that the data length of the remaining transfer amount is longer than the data length transmittable in one transfer, the processing proceeds to Step S82. In Step S82, the CCI layer processing unit 42 sets the data length transmittable in one transfer to the transfer length information, and the makes the transfer length information holding unit 52 hold the transfer length information. The processing proceeds to Step S84.

In a case where the CCI layer processing unit 42 determines, in Step S81, that the data length of the remaining transfer amount is not longer (shorter) than the data length transmittable in one transfer, the processing proceeds to Step S83. In Step S83, the CCI layer processing unit 42 sets the remaining transfer amount to the transfer length information, and makes the transfer length information holding unit 52 hold the transfer length information. The processing proceeds to Step S84.

In Step S84, the command transmission unit 23 transmits a write command to the I3C slave 13. In Step S85, the data transmission unit 21 transmits an index to the I3C slave 13. After that, in Step S86, the transfer length information transmission unit 55 makes the data transmission unit 21 transmit, to the I3C slave 13, the transfer length information held by the transfer length information holding unit 52.

In Step S87, the CCI layer processing unit 42 sets the transfer length information currently held by the transfer length information holding unit 52 as a data length of the remaining data to be written to the register.

In Step S88, the CCI layer processing unit 42 determines whether the current remaining data length is 2 bytes or more, 1 byte, or 0 bytes.

In a case where the CCI layer processing unit 42 determines that the current remaining data length is 2 bytes or more in Step S88, the processing proceeds to Step S89. In Step S89, the CCI layer processing unit 42 supplies, to the I3C master 12, data of 2 bytes that is transferred from the I3C master 12 to the I3C slave 13 to be written to the register. In Step S90, the CCI layer processing unit 42 makes an update by decrementing the remaining data length by 2 bytes.

Meanwhile, in a case where the CCI layer processing unit 42 determines that the current remaining data length is 1 byte in Step S88, the processing proceeds to Step S91. In Step S91, in the CCI layer processing unit 42, data of 1 byte that is transferred from the I3C master 12 to the I3C slave 13 to be written to the register is supplied to the I3C master 12, and dummy data of 1 byte is added by the invalid data processing unit 54. Then, the CCI layer processing unit 42 makes an update by decrementing the remaining data length by 1 byte in Step S92.

After the processing in Step S90 or S92, the processing proceeds to Step S93 where the I3C master 12 transmits the data, which has been supplied from the CCI layer processing unit 42 in Step S89 or S91, to the I3C slave 13 by the data transmission unit 21. The processing returns to Step S88.

Meanwhile, in a case where the CCI layer processing unit 42 determines that the current remaining data length is 0 bytes in Step S88, the processing proceeds to Step S94. That is, in this case, transfer of all data based on the data transfer request received in Step S22 of FIG. 9 has been completed, and the I3C master 12 transmits a CRC word in Step S94.

In Step S95, the CCI layer processing unit 42 subtracts the transfer length information from the current remaining transfer amount to update the remaining transfer amount (=remaining transfer amount−Length).

In Step S96, the CCI layer processing unit 42 determines whether or not the updated remaining transfer amount is 0.

In a case where the CCI layer processing unit 42 determines that the updated remaining transfer amount is not 0 in Step S96, the processing proceeds to Step S97. In Step S97, the I3C master 12 transmits a command that is an instruction to restart communication in the HDR mode, and the processing then returns to Step S81. A similar processing is repeated thereafter.

In contrast, in a case where the CCI layer processing unit 42 determines that the updated remaining transfer amount is 0 in Step S96, the DDR write transfer processing is ended, and the processing proceeds to Step S36 of FIG. 10.

As described with reference to FIG. 10 to FIG. 13, the system controller 41 can perform the register R/W transfer processing in the DDR mode.

Next, with reference to FIG. 14 to FIG. 17, the register R/W transfer processing in the TSL/TSP mode (Step S25 of FIG. 9) is described.

Figure 14:
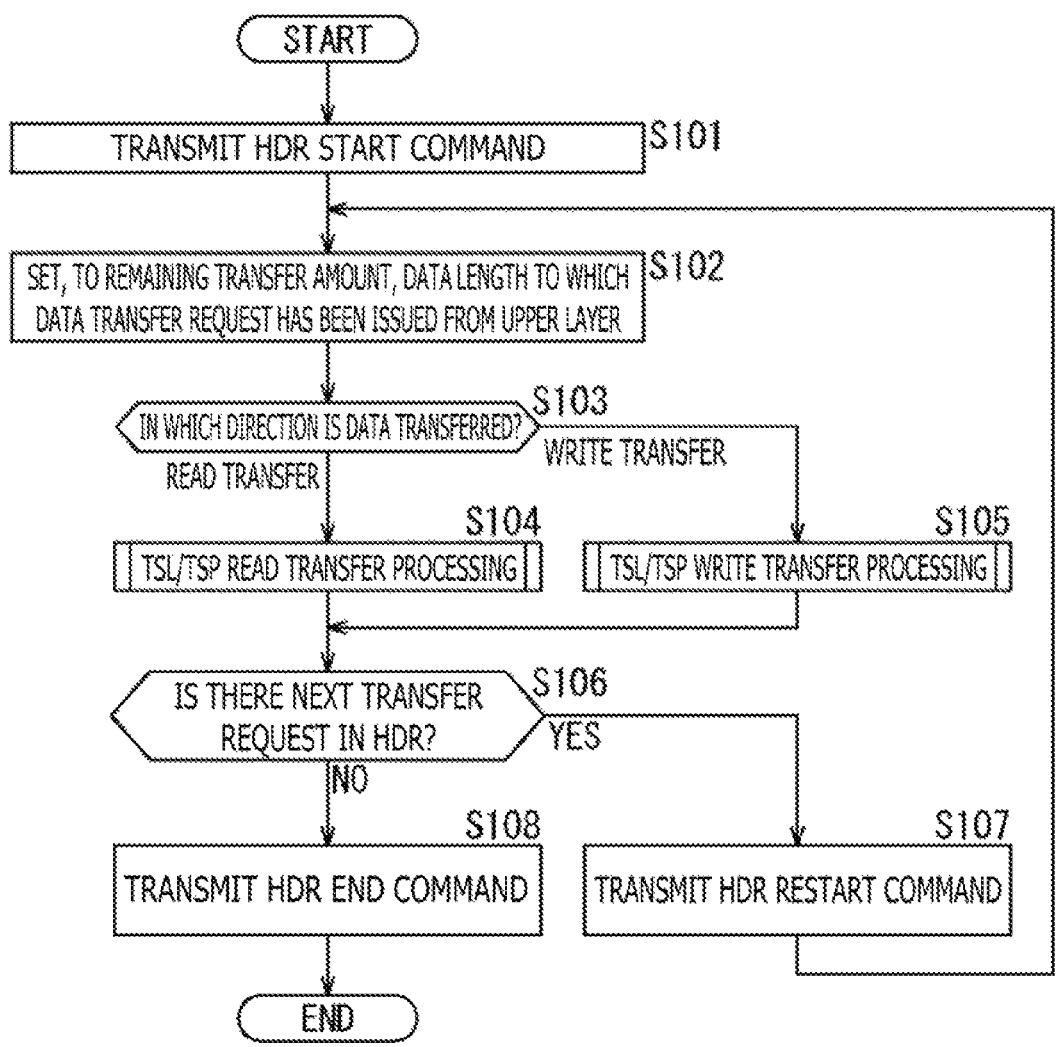
FIG. 14 is a flowchart illustrating register R/W transfer processing in the TSL/TSP mode.

FIG. 14 is a flowchart illustrating the register R/W transfer processing in the TSL/TSP mode.

In Step S101, the I3C master 12 starts communication in the HDR mode with all of the I3C slaves 13 connected to the bus IF 11, and transmits an HDR start command (ENTHDR 1/2) for establishing communication in the TSL/TSP mode.

In Step S102, the CCI layer processing unit 42 sets, to a remaining transfer amount, the data length of the data to which the data transfer request has been issued from the CPU 43, which is the upper layer, in Step S22 of FIG. 9. The remaining transfer amount indicates remaining data to be transferred to/from the controlled device 61.

In Step S103, the CCI layer processing unit 42 determines whether a transfer direction of the data requested by the CPU 43 is the read transfer or the write transfer.

In a case where the CCI layer processing unit 42 determines that the data transfer direction is the read transfer in Step S103, the processing proceeds to Step S104 where TSL/TSP read transfer processing is performed as described later with reference to FIG. 15.

In contrast, in a case where the CCI layer processing unit 42 determines that the data transfer direction is the write transfer in Step S103, the processing proceeds to Step S105 where TSL/TSP write transfer processing is performed as described later with reference to FIG. 17.

After the processing of the TSL/TSP read transfer processing in Step S104 or the processing of the TSL/TSP write transfer processing in Step S105, the processing proceeds to Step S106. Then, in Steps S106 to S108, processing processes similar to those in Steps S36 to S38 of FIG. 10 are performed, and the register R/W transfer processing in the TSL/TSP mode is then ended. The processing returns to Step S22 of FIG. 9.

Figure 15:
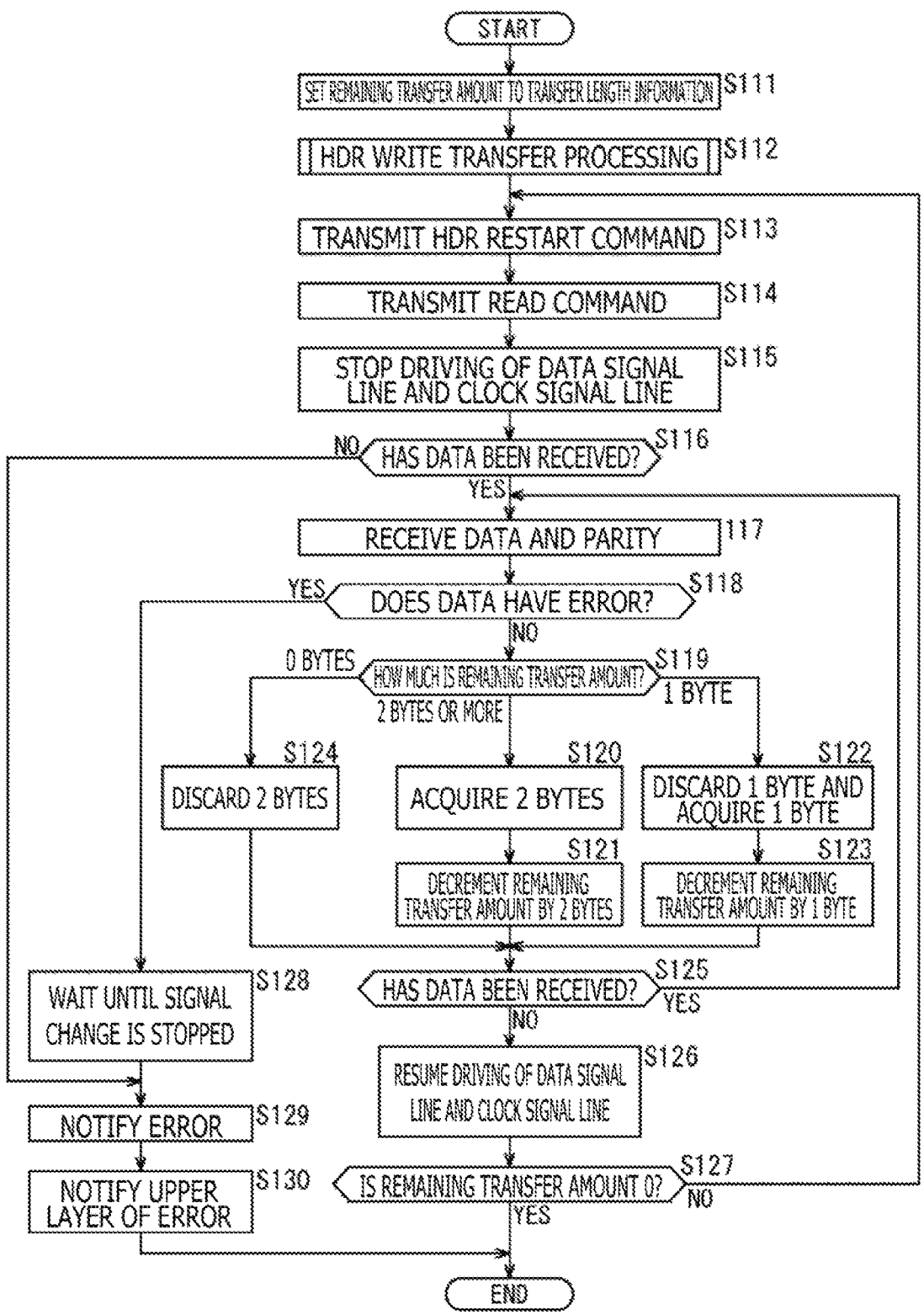
FIG. 15 is a flowchart illustrating TSL/TSP read transfer processing.

FIG. 15 is a flowchart illustrating the TSL/TSP read transfer processing that is performed in Step S104 of FIG. 14.

In Steps S111 to S114, processing processes similar to those in Steps S41 to S44 of FIG. 11 are performed. Then, in Step S115, the I3C master 12 stops driving of the data signal line 14-1 and the clock signal line 14-2. Note that, the procedure of a turnaround in the TSL/TSP mode is different from that in the DDR mode.

In Step S116, the I3C master 12 determines whether or not the data that is transmitted from the I3C slave 13 has been received. Note that, in the TSL/TSP mode, no preamble is transmitted unlike the DDR mode.

In a case where it is determined, in Step S116, that the data that is transmitted from the I3C slave 13 has been received, the processing proceeds to Step S117 where the data reception unit 22 receives the data and parity that are transmitted from the I3C slave 13.

In Step S118, the I3C master 12 determines whether or not the data that the data reception unit 22 has received in Step S117 has an error. In a case where it is determined that the data has no error, the processing proceeds to Step S119.

In Steps S119 to S124, the CCI layer processing unit 42 performs processing processes similar to those in Steps S49 to S54 of FIG. 11.

In Step S125, the I3C master 12 determines whether or not the data that is transmitted from the I3C slave 13 has been received. In a case where it is determined that the data has been received, the processing returns to Step S117. A similar processing is repeatedly performed thereafter.

In contrast, in a case where it is determined, in Step S125, that the data has not been received, the processing proceeds to Step S126 where the I3C master 12 resumes driving of the data signal line 14-1 and the clock signal line 14-2. Note that, in the TSL/TSP mode, no CRC word is transmitted unlike the DDR mode, and the procedure of a turnaround in the TSL/TSP mode is different from that in the DDR mode.

In a case where the I3C master 12 determines, in Step S118, that the data that the data reception unit 22 has received in Step S117 has an error, the processing proceeds to Step S128. Note that, in the TSL/TSP mode, the error detection conditions are different from those in the DDR mode, and it is determined that the data has an error in a case where a parity error has been detected or a symbol 2 has been received twice or more at a position other than the boundary of data words, for example.

In Step S128, the I3C master 12 waits until the signal change is stopped, and when the signal change is stopped, the processing proceeds to Step S129. That is, the procedure of error recovery in the TSL/TSP mode is different from that in the DDR mode.

Further, in a case where it is determined, in Step S116, that the data that is transmitted from the I3C slave 13 has not been received, for example, in a case where a NACK response (corresponding to three-time transmission of a symbol 2) has been received, the processing proceeds to Step S129.

In Step S129, the I3C master 12 notifies the CCI layer processing unit 42 of the error. In Step S130, the CCI layer processing unit 42 notifies the CPU 43, which is the upper layer, of the error.

After the processing in Step S130 or in a case where it is determined that the current remaining transfer amount is 0 in Step S127, the TSL/TSP read transfer processing is ended, and the processing proceeds to Step S106 of FIG. 14.

Figure 16:
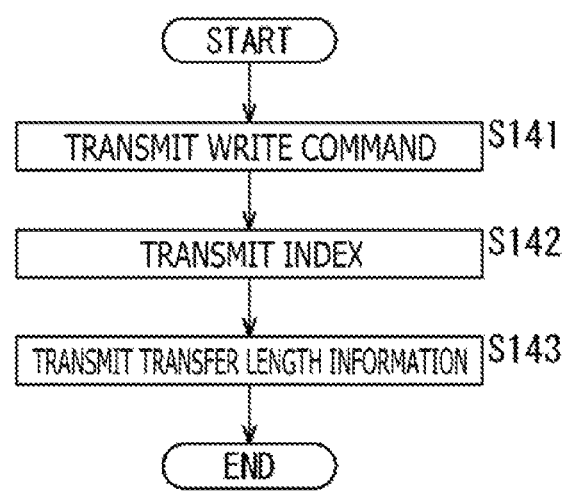
FIG. 16 is a flowchart illustrating HDR write transfer processing in the TSL/TSP read.

FIG. 16 is a flowchart illustrating HDR write transfer processing that is performed in Step S112 of FIG. 15.

In Steps S141 to S143, processing processes similar to those in Steps S71 to 73 of FIG. 12 are performed so that the HDR write transfer processing including transmitting a write command, an index, and transfer length information is performed. The processing then proceeds to Step S113 of FIG. 15. That is, the HDR write transfer processing in the TSL/TSP read transfer processing illustrated in FIG. 16 is different from the HDR write transfer processing in the DDR read transfer processing, which is described above with reference to FIG. 12, in that no CRC word is transmitted.

Figure 17:
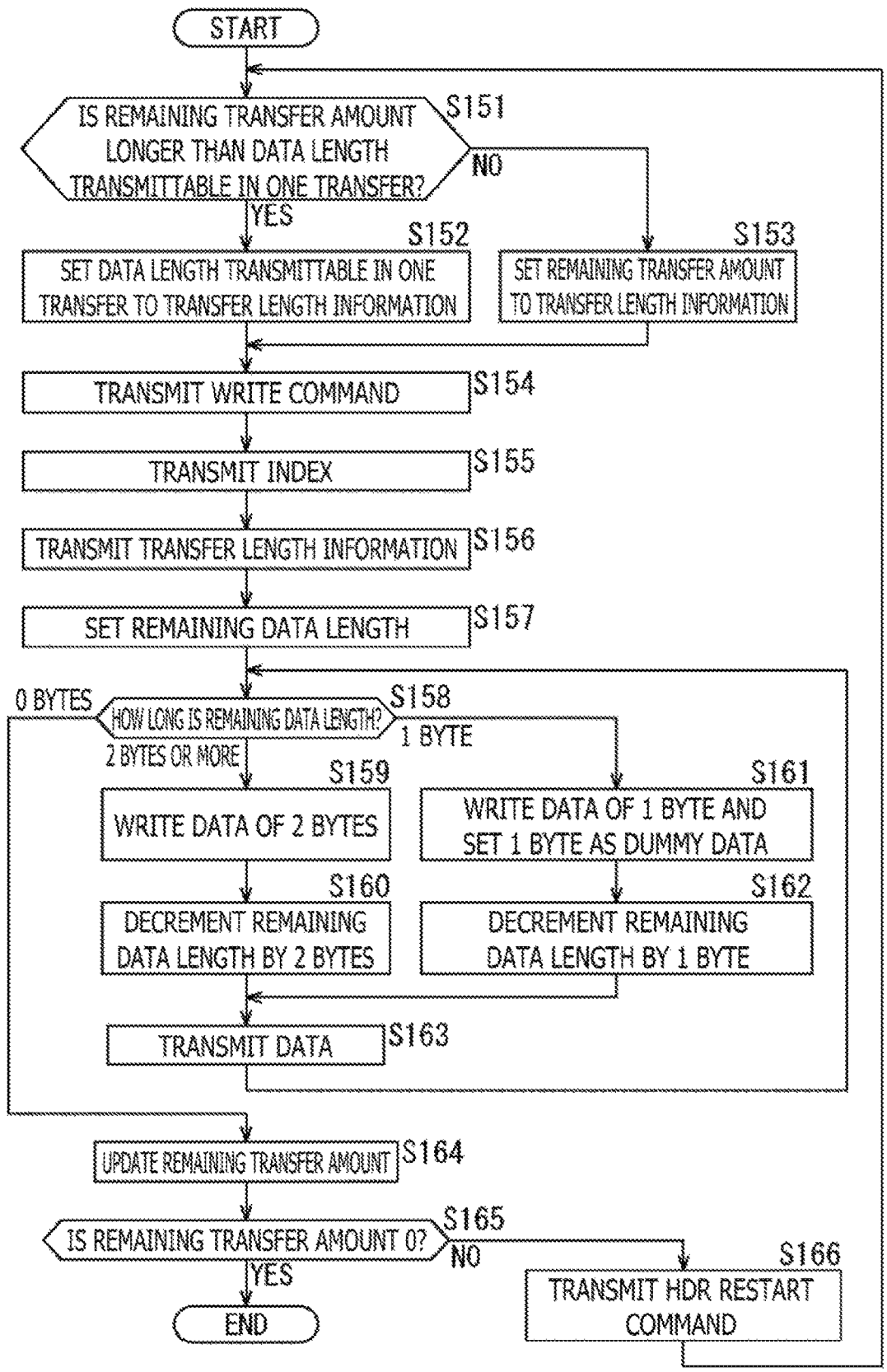
FIG. 17 is a flowchart illustrating TSL/TSP write transfer processing.

FIG. 17 is a flowchart illustrating the TSL/TSP write transfer processing that is performed in Step S105 of FIG. 14.

In Step S151 to Step S163, processing processes similar to those in Step S81 to Step S93 of FIG. 13 are performed. Then, in a case where it is determined that the current remaining data length is 0 bytes in Step S158, that is, transfer of all data based on the data transfer request received in Step S22 of FIG. 9 has been completed, the processing proceeds to Step S164.

After processing processes similar to those in Steps S95 to S97 of FIG. 13 are performed in Steps S164 to S166, the TSL/TSP write transfer processing is ended, and the processing proceeds to Step S106 of FIG. 14. That is, the TSL/TSP write transfer processing illustrated in FIG. 17 is different from the DDR write transfer processing, which is described above with reference to FIG. 13, in that no CRC word is transmitted.

As described with reference to FIG. 14 to FIG. 17, the system controller 41 can perform the register R/W transfer processing in the TSL/TSP mode.

<Data Transfer Processing in Controlled Device>

With reference to FIG. 18 to FIG. 25, data transfer processing that is executed in the controlled device 61 is described.

Figure 18:
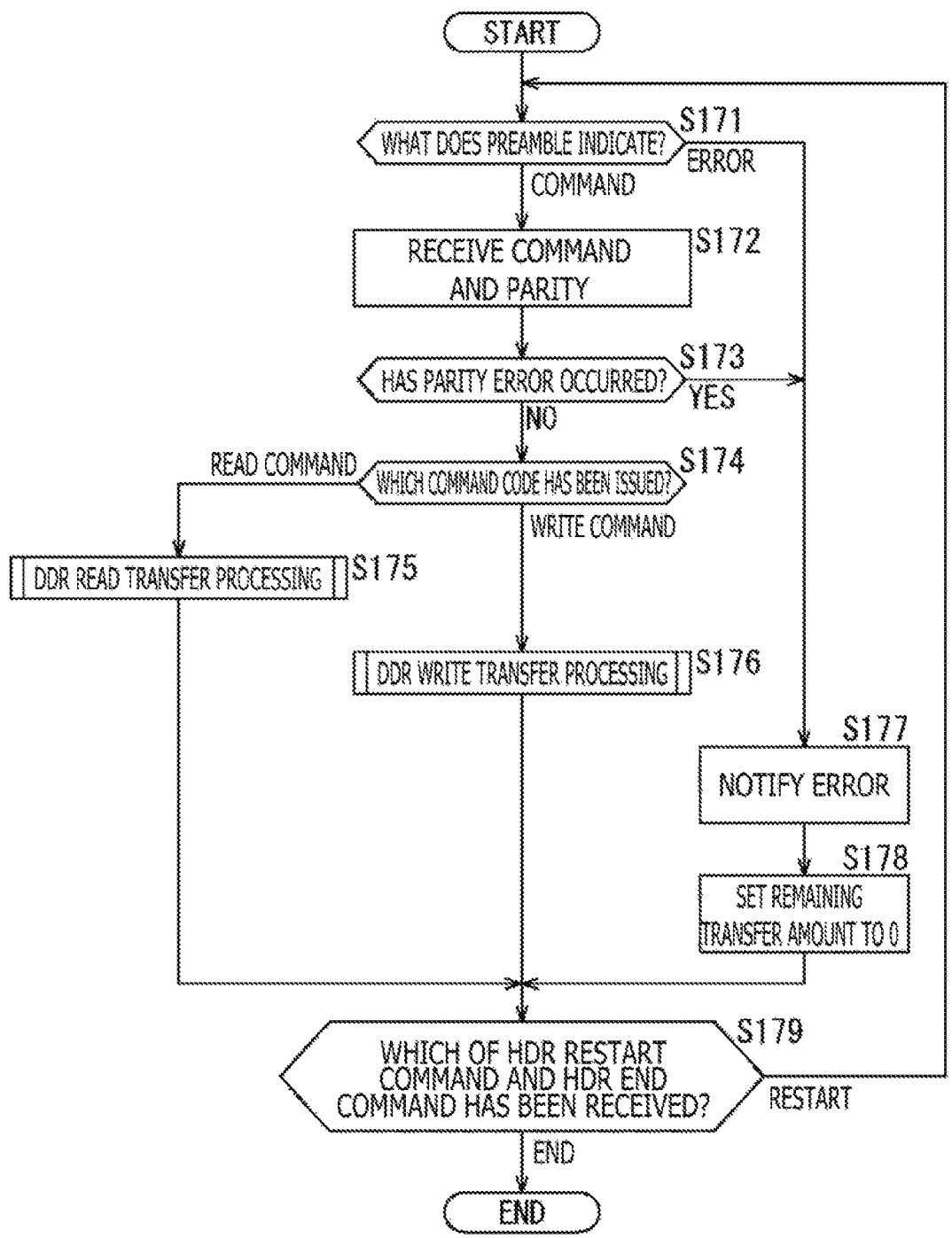
FIG. 18 is a flowchart illustrating data transfer processing that is executed in the controlled device in the DDR mode.

FIG. 18 is a flowchart illustrating data transfer processing that is executed in the controlled device 61 when the system controller 41 executes the register R/W transfer processing in the DDR mode, which is described above with reference to FIG. 10.

When the I3C slave 13 receives an HDR start command (ENTHDR0) for establishing communication in the DDR mode that is transmitted from the I3C master 12, for example, the processing is started. Then, in Step S171, the I3C slave 13 makes a determination based on a preamble of a signal that the I3C master 12 transmits subsequently to the HDR start command. In a case where the I3C slave 13 determines, on the basis of the preamble, that a command is to be transmitted from the I3C master 12 in Step S171, the processing proceeds to Step S172.

In Step S172, in the I3C slave 13, the command interpretation unit 33 receives the command and parity that are transmitted from the I3C master 12.

In Step S173, the command interpretation unit 33 determines, with the use of the parity received in Step S172, whether or not the command received in Step S172 has an error. Then, in a case where the command interpretation unit 33 determines that no parity error has occurred, the processing proceeds to Step S174.

In Step S174, the command interpretation unit 33 determines whether a command code of the command received in Step S172 is a read command or a write command.

In a case where the command interpretation unit 33 determines that the command code is the read command in Step S174, the processing proceeds to Step S175 where DDR read transfer processing is performed as described later with reference to FIG. 19.

In contrast, in a case where the command interpretation unit 33 determines that the command code is the write command in Step S174, the processing proceeds to Step S176 where DDR write transfer processing is performed as described later with reference to FIG. 20.

After the processing of the DDR read transfer processing in Step S175 or the DDR write transfer processing in Step S176, the processing proceeds to Step S179.

In contrast, in a case where the occurrence of a framing error is detected on the basis of the preamble in Step S171 or in a case where it is determined, in Step S173, that a parity error has occurred, the processing proceeds to Step S177.

In Step S177, the I3C slave 13 notifies the CCI layer processing unit 62 of the error. In Step S178, the CCI layer processing unit 62 sets the remaining transfer amount to 0, and the processing then proceeds to Step S179.

In Step S179, the I3C slave 13 determines whether the command interpretation unit 33 has received a command that is an instruction to restart communication in the HDR mode or a command that is an instruction to end communication in the HDR mode.

In a case where it is determined, in Step S179, that the command interpretation unit 33 has received the command that is an instruction to restart communication in the HDR mode, the processing returns to Step S171. A similar processing is repeatedly performed thereafter.

In contrast, in a case where it is determined, in Step S179, that the command interpretation unit 33 has received the command that is an instruction to end communication in the HDR mode, the data transfer processing in the controlled device 61 is ended.

Figure 19:
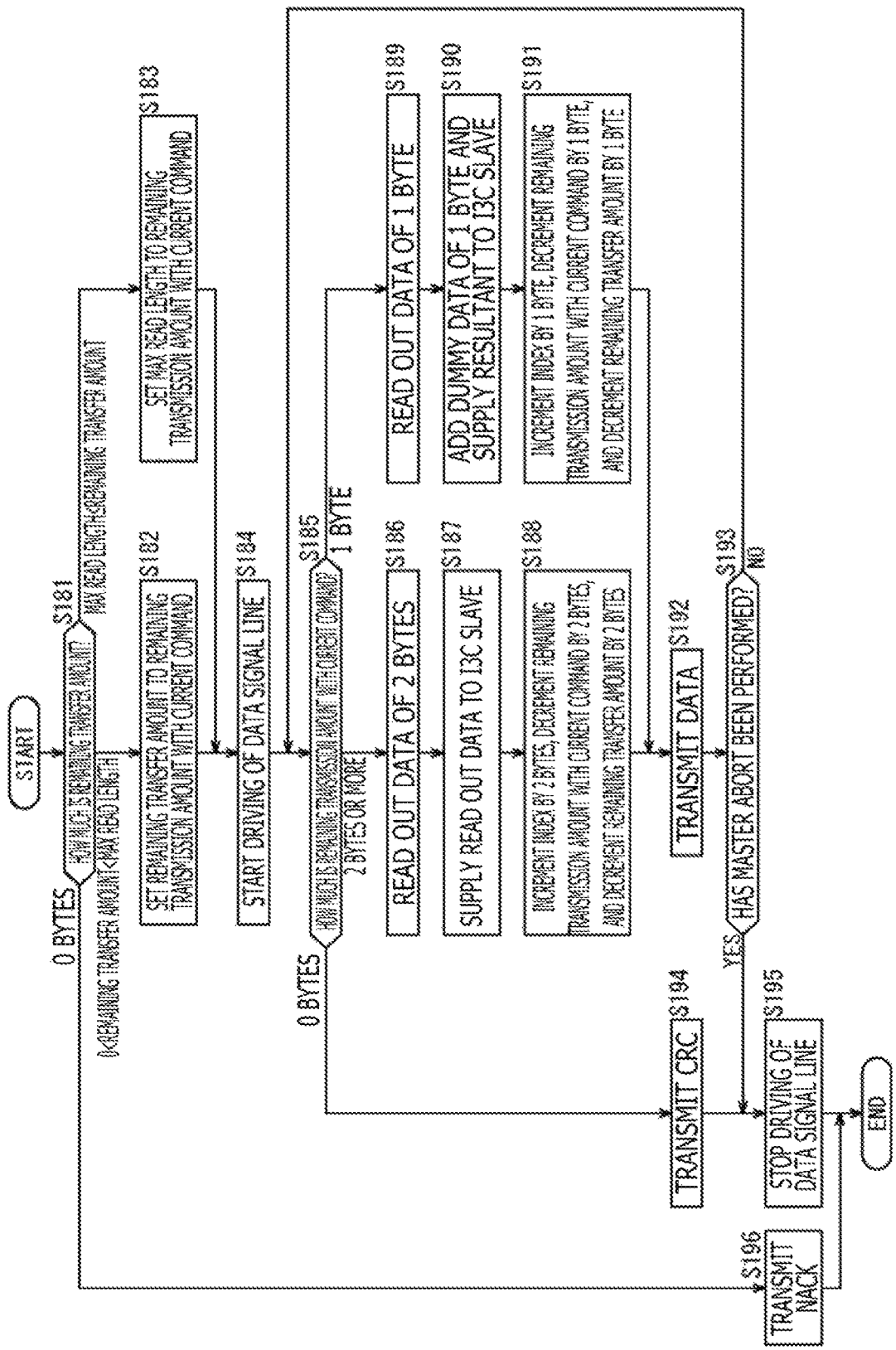
FIG. 19 is a flowchart illustrating DDR read transfer processing.

FIG. 19 is a flowchart illustrating the DDR read transfer processing that is performed in Step S175 of FIG. 18.

In Step S181, the CCI layer processing unit 62 determines whether the current remaining transfer amount is larger than 0 bytes and shorter than the max read length, is equal to or longer than the max read length, or is 0 bytes.

In a case where the CCI layer processing unit 62 determines that the current remaining transfer amount is larger than 0 bytes and shorter than the max read length in Step S181, the processing proceeds to Step S182. In Step S182, the CCI layer processing unit 62 sets the current remaining transfer amount to the remaining transmission amount of the data to be transmitted in response to the current read command.

Meanwhile, in a case where the CCI layer processing unit 62 determines that the current remaining transfer amount is equal to or longer than the max read length in Step S181, the processing proceeds to Step S183. In Step S183, the CCI layer processing unit 62 sets the max read length to the remaining transmission amount of the data to be transmitted in response to the current read command.

After the processing in Step S182 or S183, the processing proceeds to Step S184 where the I3C slave 13 starts driving of the data signal line 14-1.

In Step S185, the CCI layer processing unit 62 determines whether the remaining transmission amount to be transmitted in response to the current read command is 2 bytes or more, 1 byte, or 0 bytes.

In a case where the CCI layer processing unit 62 determines, in Step S185, that the remaining transmission amount of the data to be transmitted in response to the current read command is 2 bytes or more, the processing proceeds to Step S186.

In Step S186, the CCI layer processing unit 62 reads out data of 2 bytes from the register. Then, in Step S187, the CCI layer processing unit 62 supplies the data of 2 bytes read out in Step S186 to the I3C slave 13. In Step S188, the CCI layer processing unit 62 makes updates by incrementing the index by 2 bytes, decrementing the remaining transmission amount of the data to be transmitted in response to the current command by 2 bytes, and decrementing the remaining transfer amount by 2 bytes.

Meanwhile, in a case where the CCI layer processing unit 62 determines, in Step S185, that the remaining transmission amount of the data to be transmitted in response to the current read command is 1 byte, the processing proceeds to Step S189.

In Step S189, the CCI layer processing unit 62 reads out data of 1 byte from the register. Then, in Step S190, the CCI layer processing unit 62 adds dummy data of 1 byte to the data of 1 byte read out in Step S189, and supplies the resultant to the I3C slave 13. In Step S191, the CCI layer processing unit 62 makes updates by incrementing the index by 1 byte, decrementing the remaining transmission amount of the data to be transmitted in response to the current command by 1 byte, and decrementing the remaining transfer amount by 1 byte.

After the processing in Step S188 or S191, the processing proceeds to Step S192 where the I3C slave 13 transmits the data, which has been supplied from the CCI layer processing unit 62 in Step S187 or S190, to the I3C master 12 by the data transmission unit 31.

In Step S193, the I3C slave 13 determines whether or not a master abort that is an instruction to interrupt communication has been performed by the I3C master 12.

In a case where the I3C slave 13 determines, in Step S193, that the master abort has not been performed, the processing returns to Step S185. A similar processing is repeatedly performed thereafter. In contrast, in a case where the I3C slave 13 determines, in Step S193, that the master abort has been performed, the processing proceeds to Step S195.

Meanwhile, in a case where the CCI layer processing unit 62 determines, in Step S185, that the remaining transmission amount to be transmitted in response to the current read command is 0 bytes, the processing proceeds to Step S194. In Step S194, the I3C slave 13 transmits a CRC word, and the processing proceeds to Step S195.

In Step S195, the I3C slave 13 stops driving of the data signal line 14-1.

Meanwhile, in a case where it is determined that the current remaining transfer amount is 0 bytes in Step S181, the processing proceeds to Step S196. That is, in this case, the CCI protocol is violated, and hence the I3C slave 13 transmits a NACK to the I3C master 12 in Step S196.

After the processing in Step S195 or S196, the DDR read transfer processing is ended, and the processing proceeds to Step S179 of FIG. 18.

Figure 20:
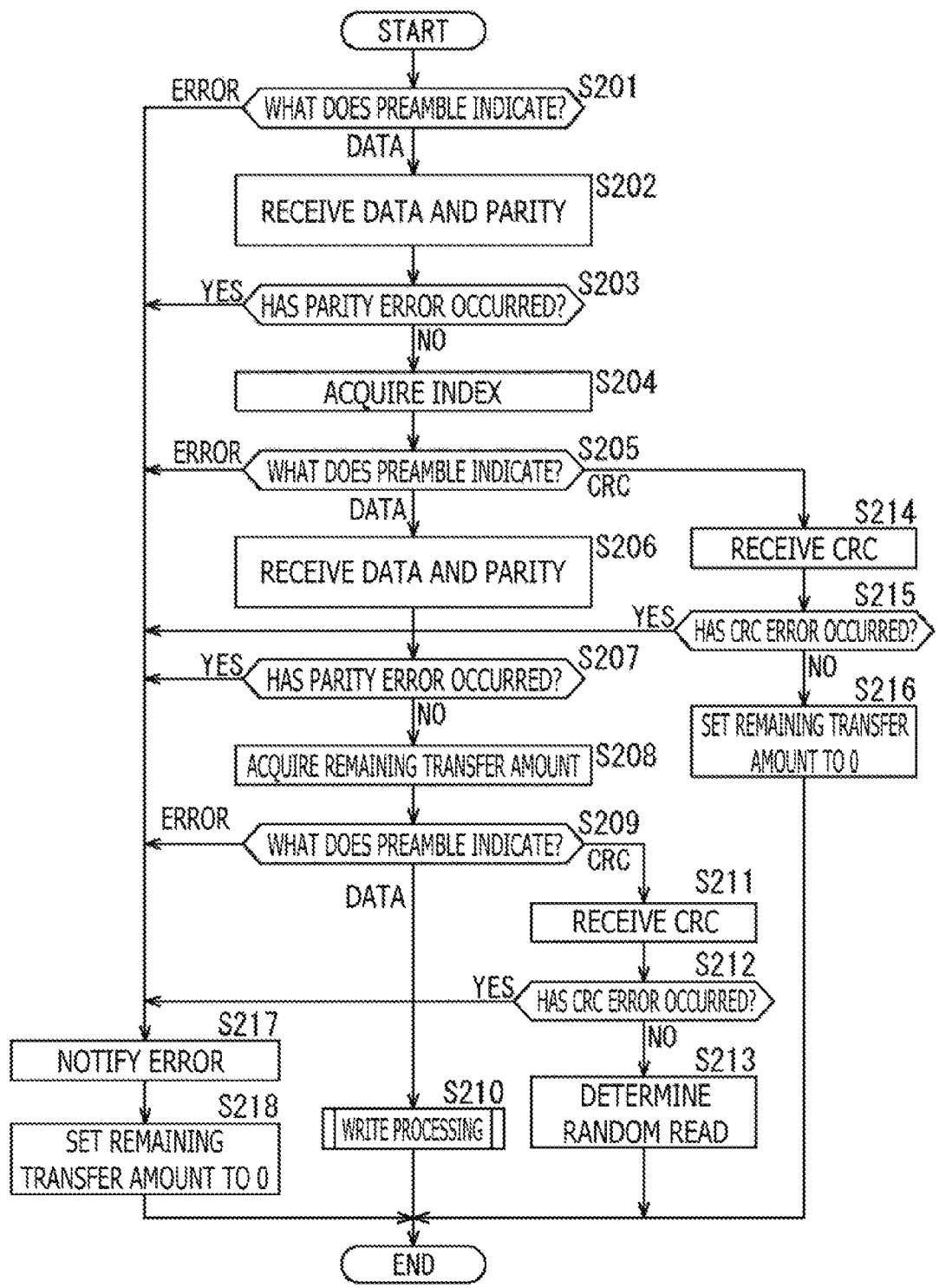
FIG. 20 is a flowchart illustrating DDR write transfer processing.

FIG. 20 is a flowchart illustrating the DDR write transfer processing that is performed in Step S176 of FIG. 18.

In Step S201, the I3C slave 13 makes a determination based on a preamble of a signal that is transmitted from the I3C master 12.

In a case where the I3C slave 13 determines, on the basis of the preamble, that data is to be transmitted from the I3C master 12 in Step S201, the processing proceeds to Step S202.

In Step S202, in the I3C slave 13, the data reception unit 32 receives the data and parity that are transmitted from the I3C master 12.

In Step S203, the I3C slave 13 determines, with the use of the parity received in Step S202, whether or not the data received in Step S202 has an error. Then, in a case where the I3C slave 13 determines that no parity error has occurred, the processing proceeds to Step S204.

In Step S204, the CCI layer processing unit 62 acquires the data that the data reception unit 32 has received in Step S202, that is, the index that the I3C master 12 has transmitted.

In Step S205, the I3C slave 13 determines, on the basis of a preamble of a signal that is transmitted from the I3C master 12, whether data is to be transmitted, a CRC word is to be transmitted, or an error has occurred.

In a case where the I3C slave 13 determines, in Step S205, that data is to be transmitted, the processing proceeds to Step S206.

In Step S206, in the I3C slave 13, the data reception unit 32 receives the data and parity that are transmitted from the I3C master 12.

In Step S207, the I3C slave 13 determines, with the use of the parity received in Step S206, whether or not the data received in Step S206 has an error. Then, in a case where the I3C slave 13 determines that no parity error has occurred, the processing proceeds to Step S208.

In Step S208, the CCI layer processing unit 62 acquires, as the remaining transfer amount, the data that the data reception unit 32 has received in Step S206, that is, the transfer length information that the I3C master 12 has transmitted.

In Step S209, the I3C slave 13 determines, on the basis of a preamble of a signal that is transmitted from the I3C master 12, whether data is to be transmitted, a CRC word is to be transmitted, or an error has occurred.

In a case where the I3C slave 13 determines, in Step S209, that data is to be transmitted, the processing proceeds to Step S210 where write processing (FIG. 21) is performed.

Meanwhile, in a case where the I3C slave 13 determines, in Step S209, that a CRC word is to be transmitted, the processing proceeds to Step S211 where the data reception unit 32 receives the CRC word.

In Step S212, the I3C slave 13 determines whether or not the CRC word that the data reception unit 32 has received in Step S211 has an error. In a case where it is determined that the CRC word has no error in Step S212, the processing proceeds to Step S213 where the I3C slave 13 determines random read.

Meanwhile, in a case where the I3C slave 13 determines, in Step S205, that a CRC word is to be transmitted, the processing proceeds to Step S214 where the data reception unit 32 receives the CRC word.

In Step S215, the I3C slave 13 determines whether or not the CRC word that the data reception unit 32 has received in Step S214 has an error. In a case where the I3C slave 13 determines that the CRC word has no error in Step S215, the processing proceeds to Step S216. That is, in this case, the CCI protocol is violated, and hence the CCI layer processing unit 62 sets the remaining transfer amount to 0 in Step S216.

Meanwhile, in a case where the occurrence of a framing error is detected on the basis of the preamble in Step S201, Step S205, or Step S209, the processing proceeds to Step S217. In a similar manner, in a case where it is determined, in Steps S203 and S207, that a parity error has occurred, the processing proceeds to Step S217. In addition, in a case where it is determined, in Step S212 or S215, that a CRC error has occurred, the processing proceeds to Step S217.

In Step S217, the I3C slave 13 notifies the CCI layer processing unit 62 of the error. In Step S218, the CCI layer processing unit 62 sets the remaining transfer amount to 0.

Then, after the processing in Step S210, Step S213, Step S216, or Step S218, the DDR write transfer processing is ended, and the processing proceeds to Step S179 of FIG. 18.

Figure 21:
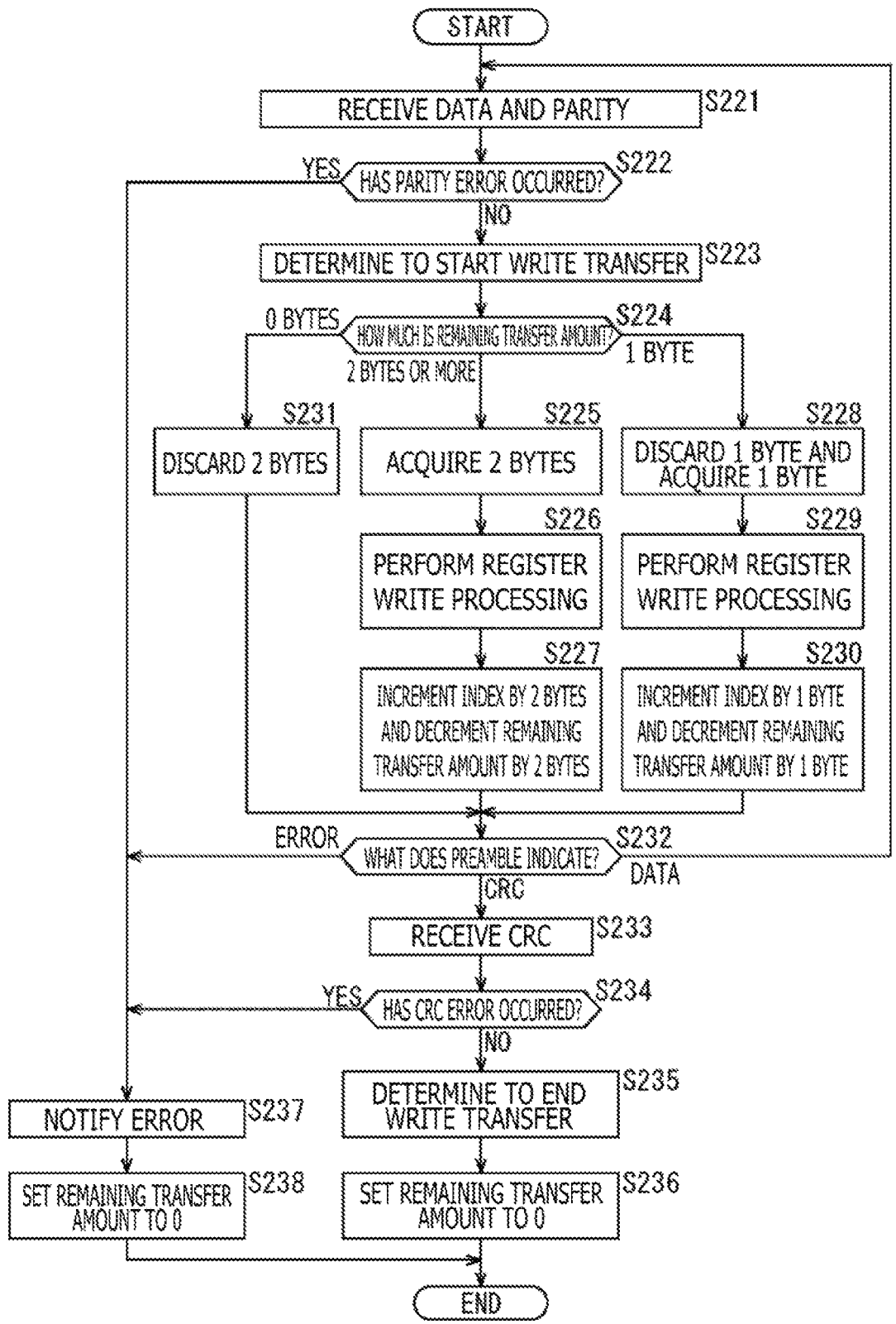
FIG. 21 is a flowchart illustrating write processing.

FIG. 21 is a flowchart illustrating the write processing that is performed in Step S210 of FIG. 20.

In Step S221, in the I3C slave 13, the data reception unit 32 receives the data and parity that are transmitted from the I3C master 12.

In Step S222, the I3C slave 13 determines, with the use of the parity received in Step S221, whether or not the data received in Step S221 has an error. Then, in a case where the I3C slave 13 determines that no parity error has occurred, the processing proceeds to Step S223 where the CCI layer processing unit 62 determines, with the success of data reception, to start the write transfer.

In Step S224, the CCI layer processing unit 62 determines whether the remaining transfer amount is 2 bytes or more, 1 byte, or 0 bytes.

In a case where it is determined that the remaining transfer amount is 2 bytes or more in Step S224, the processing proceeds to Step S225 where the CCI layer processing unit 62 acquires, as data to be written to the register, data of 2 bytes that the I3C slave 13 has received. Then, the CCI layer processing unit 62 performs register write processing of the data of 2 bytes in Step S226, and makes updates by incrementing the index by 2 bytes and decrementing the remaining transfer amount by 2 bytes in Step S227.

Meanwhile, in a case where it is determined that the remaining transfer amount is 1 byte in Step S224, the processing proceeds to Step S228. In Step S228, in the CCI layer processing unit 62, dummy data of 1 byte of the data of 2 bytes that the I3C slave 13 has received is discarded by the invalid data processing unit 74, and the remaining data of 1 byte is acquired as data to be written to the register. Then, the CCI layer processing unit 62 performs register write processing of the data of 1 byte in Step S229, and makes updates by incrementing the index by 1 byte and decrementing the remaining transfer amount by 1 byte in Step S230.

Meanwhile, in a case where it is determined that the remaining transfer amount is 0 bytes in Step S224, the processing proceeds to Step S231. That is, in this case, the CCI protocol is violated, and hence, in Step S231, the CCI layer processing unit 62 discards the data of 2 bytes that the I3C slave 13 has received.

After the processing in Step S227, Step S230, or Step S231, the processing proceeds to Step S232. In Step S232, the I3C slave 13 determines, on the basis of a preamble of a signal that is transmitted from the I3C master 12, whether data is to be transmitted, a CRC word is to be transmitted, or an error has occurred.

In a case where the I3C slave 13 determines, in Step S232, that data is to be transmitted, the processing returns to Step S221. A similar processing is repeated thereafter.

Meanwhile, in a case where the I3C slave 13 determines, in Step S232, that a CRC word is to be transmitted, the processing proceeds to Step S233 where the data reception unit 32 receives the CRC word.

In Step S234, the I3C slave 13 determines whether or not the CRC word that the data reception unit 32 has received in Step S233 has an error. In a case where it is determined that the CRC word has no error in Step S234, the processing proceeds to Step S235. That is, in this case, the CCI layer processing unit 62 determines, with the success of CRC word reception, to end the write transfer in Step S235, and sets the remaining transfer amount to 0 in Step S236.

Meanwhile, in a case where it is determined that a parity error has occurred in Step S222, a case where it is determined that a framing error has occurred on the basis of the preamble in Step S232, or a case where it is determined that a CRC error has occurred in Step S234, the processing proceeds to Step S237.

In Step S237, the I3C slave 13 notifies the CCI layer processing unit 62 of the error. In Step S238, the CCI layer processing unit 62 sets the remaining transfer amount to 0.

Then, after the processing in Step S236 or S238, the write processing is ended, and the processing proceeds to Step S179 of FIG. 18.

As described with reference to FIG. 18 to FIG. 21, the controlled device 61 can perform the register R/W transfer processing in the DDR mode.

Figure 22:
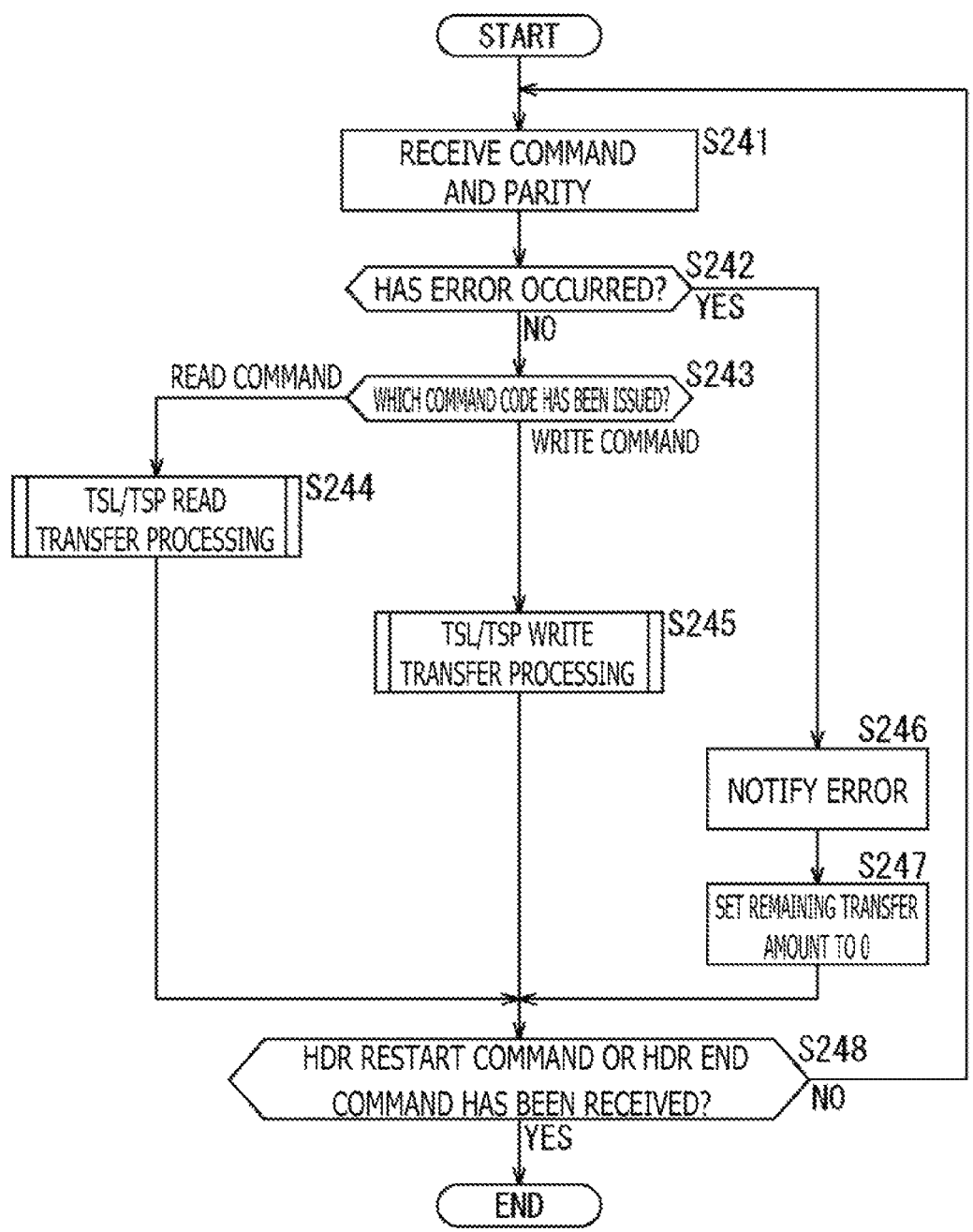
FIG. 22 is a flowchart illustrating data transfer processing that is executed in the controlled device in the TSL/TSP mode.

FIG. 22 is a flowchart illustrating data transfer processing that is executed in the controlled device 61 when the system controller 41 executes the register R/W transfer processing in the TSL/TSP mode, which is described above with reference to FIG. 14.

When the I3C slave 13 receives an HDR start command (ENTHDR1/2) for establishing communication in the DDR mode that is transmitted from the I3C master 12, for example, the processing is started. Then, in Step S241, in the I3C slave 13, the command interpretation unit 33 receives the command and parity that are transmitted from the I3C master 12. Note that, in the TSL/TSP mode, no preamble is transmitted unlike the DDR mode.

In Step S242, the command interpretation unit 33 determines whether or not the command received in Step S172 has an error. Note that, in the TSL/TSP mode, the error detection conditions are different from those in the DDR mode, and it is determined that the command has an error in a case where a parity error has been detected or a symbol 2 has been received twice or more at a position other than the boundary of data words, for example.

In a case where the command interpretation unit 33 determines, in Step S242, that no error has occurred, the processing proceeds to Step S243.

In Step S243, the command interpretation unit 33 determines whether a command code of the command received in Step S242 is a read command or a write command.

In a case where the command interpretation unit 33 determines that the command code is the read command in Step S243, the processing proceeds to Step S244 where TSL/TSP read transfer processing is performed as described later with reference to FIG. 23.

In contrast, in a case where the command interpretation unit 33 determines that the command code is the write command in Step S243, the processing proceeds to Step S245 where TSL/TSP write transfer processing is performed as described later with reference to FIG. 24.

After the processing of the TSL/TSP read transfer processing in Step S244 or the TSL/TSP write transfer processing in Step S245, the processing proceeds to Step S248.

In contrast, in a case where the command interpretation unit 33 determines, in Step S242, that an error has occurred, the processing proceeds to Step S246. Then, in Steps S246 to S248, processing processes similar to those in Steps S177 to S179 of FIG. 18 are performed.

Figure 23:
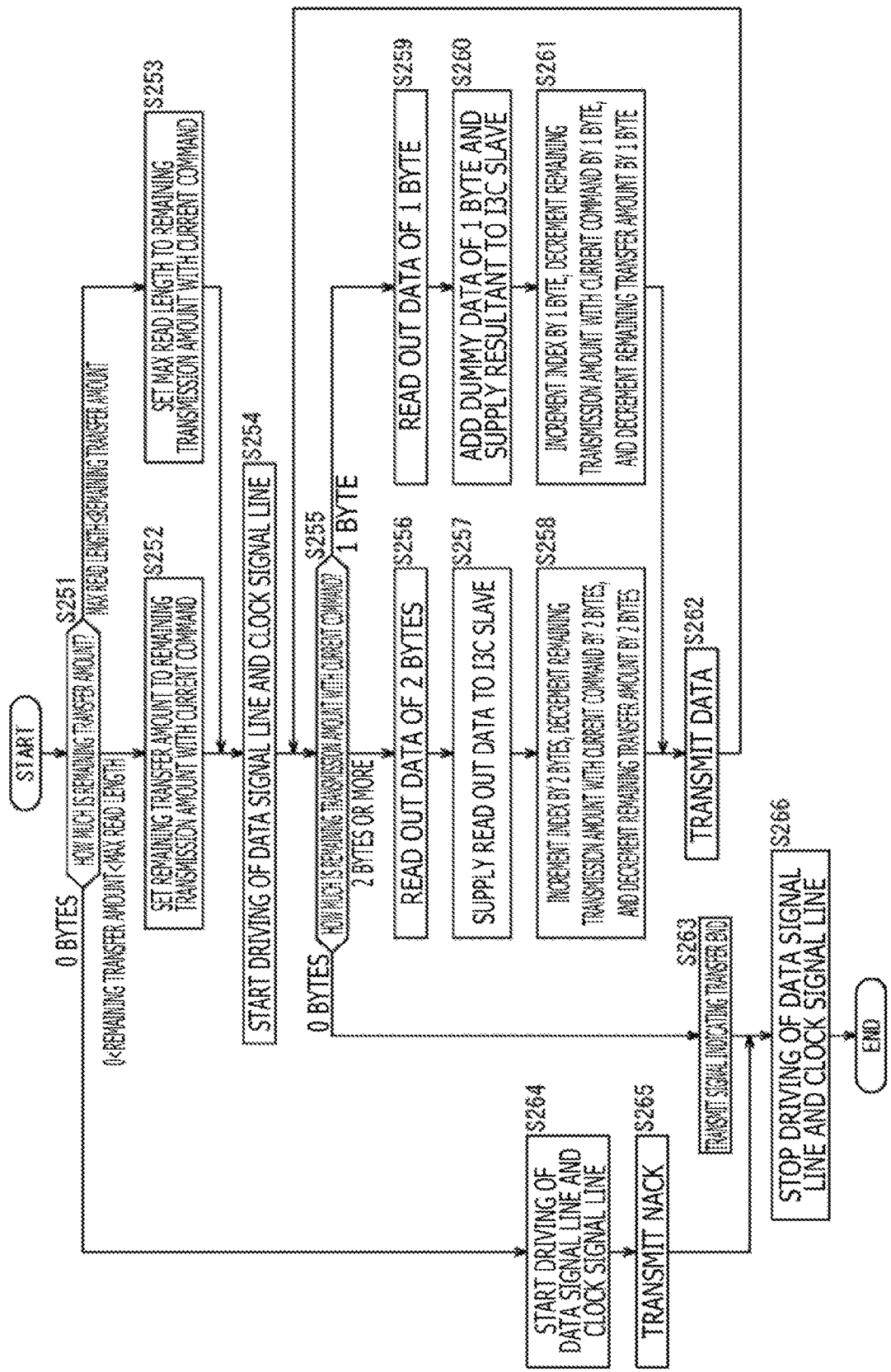
FIG. 23 is a flowchart illustrating TSL/TSP read transfer processing.

FIG. 23 is a flowchart illustrating the TSL/TSP read transfer processing that is performed in Step S244 of FIG. 22.

In Steps S251 to S253, processing processes similar to those in Steps S181 to S183 of FIG. 19 are performed. Then, after the processing in Step S252 or S253, the I3C slave 13 starts driving of the data signal line 14-1 and the clock signal line 14-2 in Step S254.

After that, in Steps S255 to S262, processing processes similar to those in Steps S185 to S192 of FIG. 19 are performed. Until it is determined, in Step S255, that the remaining transmission amount of the data to be transmitted in response to the current read command is 0 bytes, the processing is repeatedly performed. Note that, in the TSL/TSP mode, a master abort is not performed unlike the DDR mode.

In a case where it is determined that the remaining transmission amount is 0 bytes in Step S255, the processing proceeds to Step S263 where the I3C slave 13 transmits a signal (corresponding to three-time transmission of a symbol 2) indicating transfer end. Note that, in the TSL/TSP mode, no CRC word is transmitted unlike the DDR mode.

Meanwhile, in a case where it is determined that the current remaining transfer amount is 0 bytes in Step S251, the processing proceeds to Step S264. That is, in this case, the CCI protocol is violated, and hence the I3C slave 13 starts driving of the data signal line 14-1 and the clock signal line 14-2 in Step S264, and transmits a NACK (corresponding to three-time transmission of a symbol 2) in Step S265. Note that, in the TSL/TSP mode, a NACK format is different from that in the DDR mode.

After the processing in Step S263 or S265, the processing proceeds to Step S266. In Step S66, the I3C slave 13 stops driving of the data signal line 14-1 and the clock signal line 14-2, and the TSL/TSP read transfer processing is then ended. The processing proceeds to Step S248 of FIG. 22. Note that, in the TSL/TSP mode, the procedure of a turn-around is different from that in the DDR mode.

Figure 24:
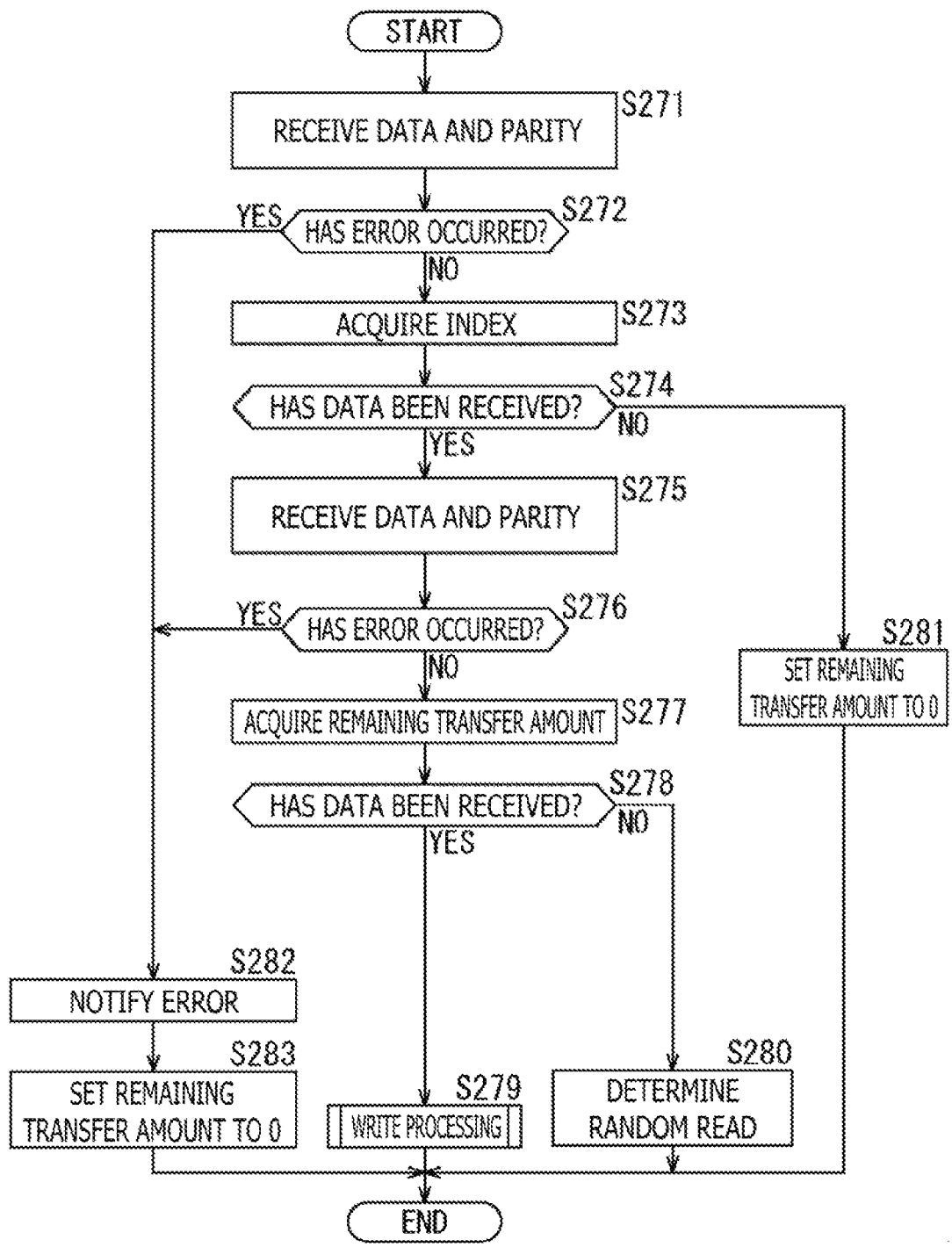
FIG. 24 is a flowchart illustrating TSL/TSP write transfer processing.

FIG. 24 is a flowchart illustrating the TSL/TSP write transfer processing that is performed in Step S245 of FIG. 22.

In Step S271, in the I3C slave 13, the data reception unit 32 receives the data and parity that are transmitted from the I3C master 12. Note that, in the TSL/TSP mode, no preamble is transmitted unlike the DDR mode.

In Step S272, the I3C slave 13 determines whether or not the data received in Step S271 has an error. Note that, in the TSL/TSP mode, the error detection conditions are different from those in the DDR mode, and it is determined that the data has an error in a case where a parity error has been detected or a symbol 2 has been received twice or more at a position other than the boundary of data words, for example.

In a case where it is determined that the data has no error in Step S272, the processing proceeds to Step S273 where the CCI layer processing unit 62 acquires the data that the data reception unit 32 has received in Step S271, that is, the index that the I3C master 12 has transmitted.

In Step S274, the I3C slave 13 determines whether or not the data that is transmitted from the I3C master 12 has been received.

In a case where it is determined, in Step S274, that the data that is transmitted from the I3C master 12 has been received, the processing proceeds to Step S275 where the data reception unit 32 receives the data and parity that are transmitted from the I3C master 12.

In Step S276, the I3C slave 13 determines, as in Step S272, whether or not the data received in Step S275 has an error. In a case where it is determined that no error has occurred, the processing proceeds to Step S277.

In Step S277, the CCI layer processing unit 62 acquires, as the remaining transfer amount, the data that the data reception unit 32 has received in Step S275, that is, the transfer length information that the I3C master 12 has transmitted.

In Step S278, the I3C slave 13 determines whether or not the data that is transmitted from the I3C master 12 has been received. Note that, in the TSL/TSP mode, no preamble is transmitted unlike the DDR mode.

In a case where the I3C slave 13 determines, in Step S278, that the data has been received, the processing proceeds to Step S279 where write processing (FIG. 25) is performed.

In contrast, in a case where it is determined, in Step S278, that the data has not been received, the processing proceeds to Step S280 where the I3C slave 13 determines the random read.

In contrast, in a case where it is determined, in Step S274, that the data that is transmitted from the I3C master 12 has not been received, the processing proceeds to Step S281. That is, in this case, the CCI protocol is violated, and hence the CCI layer processing unit 62 sets the remaining transfer amount to 0 in Step S281. Note that, in the TSL/TSP mode, no CRC word is transmitted unlike the DDR mode.

In contrast, in a case where it is determined that the received data has an error in Step S272 or S276, the processing proceeds to Step S282. In Step S282, the I3C slave 13 notifies the CCI layer processing unit 62 of the error. In Step S283, the CCI layer processing unit 62 sets the remaining transfer amount to 0.

Then, after the processing in Step S279, Step S280, Step S281, or Step S283, the TSL/TSP write transfer processing is ended, and the processing proceeds to Step S248 of FIG. 22.

Figure 25:
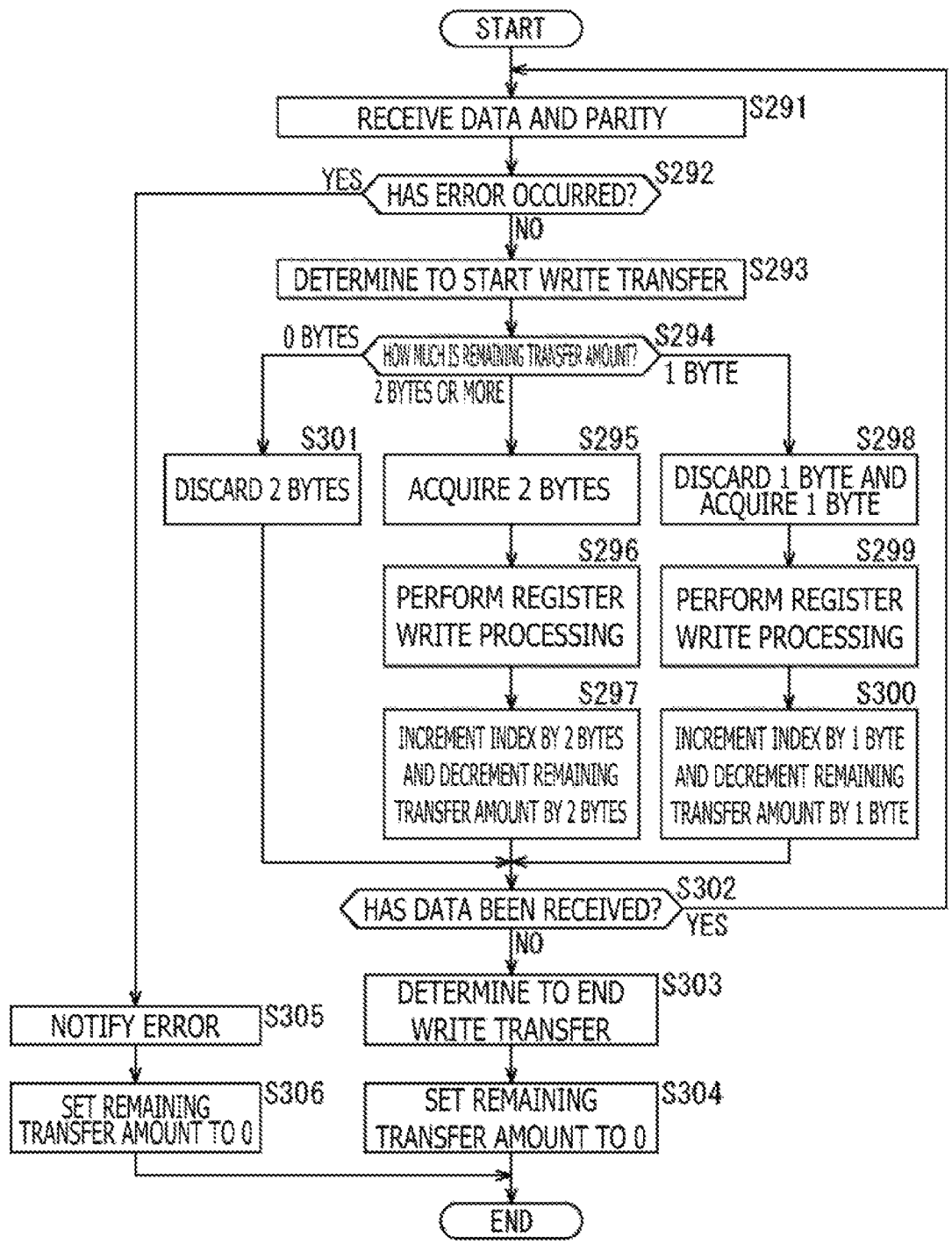
FIG. 25 is a flowchart illustrating write processing.

FIG. 25 is a flowchart illustrating the write processing that is performed in Step S279 of FIG. 24.

In Step S291, in the I3C slave 13, the data reception unit 32 receives the data and parity that are transmitted from the I3C master 12.

In Step S292, the I3C slave 13 determines whether or not the data received in Step S291 has an error. Note that, in the TSL/TSP mode, the error detection conditions are different from those in the DDR mode, and it is determined that the data has an error in a case where a parity error has been detected or a symbol 2 has been received twice or more at a position other than the boundary of data words, for example.

In a case where the I3C slave 13 determines that the data has no error in Step S292, the processing proceeds to Step S293 where the CCI layer processing unit 62 determines, with the success of data reception, to start the write transfer.

After processing processes similar to those in Steps S224 to S231 of FIG. 21 are performed in Steps S294 to S301, the I3C slave 13 determines, in Step S302, whether or not the data that is transmitted from the I3C master 12 has been received. Note that, in the TSL/TSP mode, no preamble is transmitted unlike the DDR mode.

In a case where the I3C slave 13 determines, in Step S302, that the data has been received, the processing returns to Step S291. A similar processing is repeatedly performed thereafter.

In contrast, in a case where the I3C slave 13 determines, in Step S302, that the data has not been received, the processing proceeds to Step S303. Then, the CCI layer processing unit 62 determines, with the failure of data transmission, to end the write transfer in Step S303, and sets the remaining transfer amount to 0 in Step S304.

In contrast, in a case where the I3C slave 13 determines that the data has an error in Step S292, the processing proceeds to Step S305. In Step S305, the I3C slave 13 notifies the CCI layer processing unit 62 of the error. In Step S306, the CCI layer processing unit 62 sets the remaining transfer amount to 0.

Then, after the processing in Step S304 or S306, the write processing is ended, and the processing proceeds to Step S248 of FIG. 22.

As described with reference to FIG. 22 to FIG. 25, the controlled device 61 can perform the register R/W transfer processing in the TSL/TSP mode.

<Error Measure by I3C Slave and CCI Layer Processing Unit>

Figure 26:
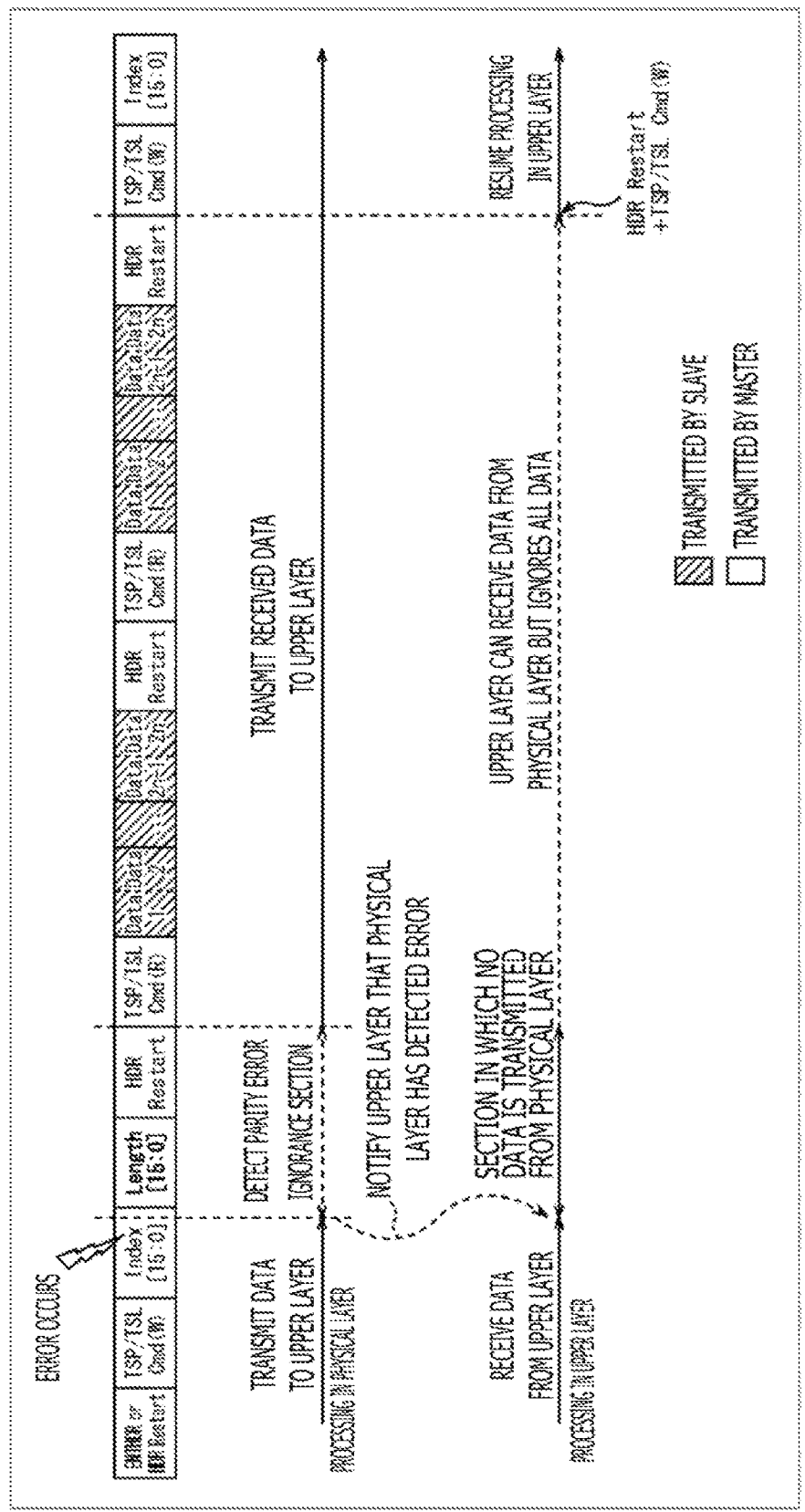
FIG. 26 is a diagram illustrating an error measure by the I3C slave and a CCI layer processing unit.

With reference to FIG. 26, an error measure by the I3C slave and the CCI layer processing unit is described. FIG. 26 illustrates an example of processing that is performed when an error occurs in successive read out of pieces of data by the read transfer processing in the TSL/TSP mode.

The I3C slave 13 is designed as follow: in the HDR mode (TSP/TSL/DDR), the I3C slave 13 ignores any communication until receiving an HDR end command (HDR_Exit) or an HDR restart command (HDR_Restart) when, for example, the I3C slave 13 detects some errors, and the I3C slave 13 returns to communication when detecting one of the command.

Here, description is given on processing for a case where an error occurs in a period from when an address setting write command (TSL/TSP_Cmd(W)) is received to when an HDR restart command immediately before a read command (TSL/TSP_Cmd(R)) is received as illustrated in FIG. 26, for example. That is, when the error occurs at this timing, the I3C slave 13 stops the processing in a period (ignorance section) from the detection of the error to the reception of the HDR restart command. Thus, in this case, the CCI layer processing unit 62 is not notified of an index (Index) and transfer length information (Length).

Then, after that, the I3C slave 13 receives the HDR restart command to return to communication, and transfers, to the CCI layer processing unit 62, a read command that is transmitted subsequently to the HDR restart command. The CCI layer processing unit 62 does not, however, grasp the index and the transfer length information, which results in a situation where the CCI layer processing unit 62 cannot determine from where the CCI layer processing unit 62 is to read out data.

In view of the above, the I3C slave 13 according to the present embodiment is designed to notify, in the case of detecting an error, the CCI layer processing unit 62 of the detection of the error (for example, Step S217 of FIG. 20 and Step S282 of FIG. 24). The CCI layer processing unit 62 is designed to set the remaining transfer amount to 0 (for example, Step S218 of FIG. 20 and Step S283 of FIG. 24) in response to this error notification.

With this, even when the CCI layer processing unit 62 receives a read command in a case where the CCI layer processing unit 62 cannot recognize an index and transfer length information due to the occurrence of an error, for example, a CCI protocol violation is determined as a result of determination that the remaining transfer amount is 0. Thus, the CCI layer processing unit 62 can ignore any communication after the I3C slave 13 has detected an error until the CCI layer processing unit 62 receives a combination of an HDR restart command and a write command (HDR_Restart+TSL/TSP_Cmd(W)) or an HDR end command.

In this way, the CCI layer processing unit 62 can be prevented from being unable to determine from where the CCI layer processing unit 62 is to read out data, and can operate similarly to how the I3C slave 13 is designed to operate. As a result, the I3C slave 13 and the CCI layer processing unit 62 can be prevented from operating differently to deal with an error, and can thus reliably execute the read processing.

Thus, the controlled device 61 can be prevented from writing data possibly having an error to the register or reading out data possibly having an error from the register, and communication can therefore be more reliably established without being disturbed by such errors.

Note that, the processing processes described above with reference to the flowcharts are not necessarily executed in chronological order in the order described as the flowcharts, and include processing processes that are executed in parallel or individually (for example, parallel processing processes or processing by an object) Further, a program may be a program that is executed by one CPU or a program that is executed by a plurality of CPUs in a distributed manner.

Further, the above-mentioned series of processing processes (communication method) can be executed by hardware or software. In a case where the series of processing processes are executed by software, a program that configures the software is installed, from a program storage medium having stored therein the program, on a computer incorporated in dedicated hardware or a general-purpose personal computer capable of executing various functions with various programs installed thereon, for example.

Figure 27:
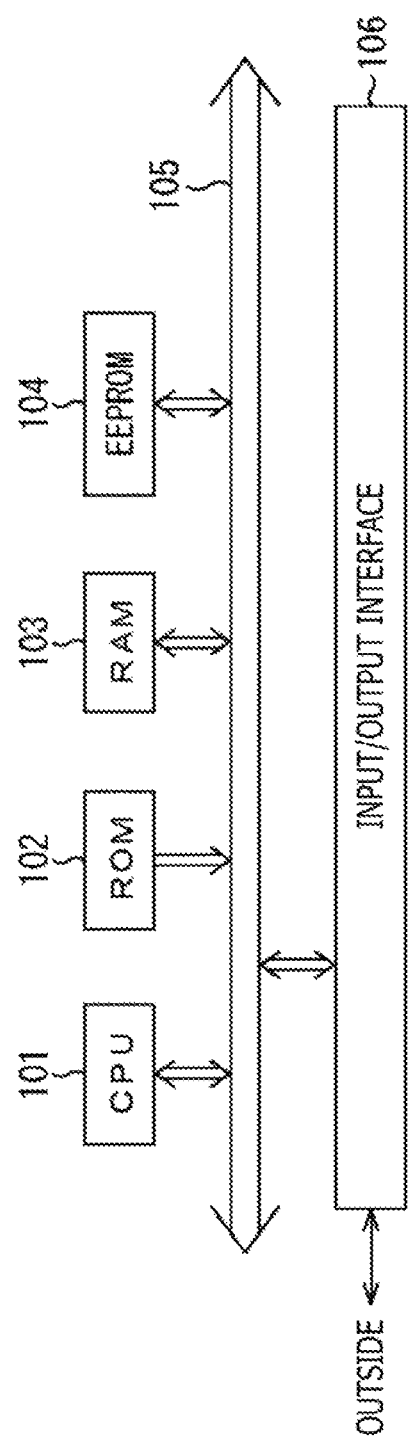
FIG. 27 is a block diagram illustrating a configuration example of a computer according to one embodiment to which the present technology is applied.

FIG. 27 is a block diagram illustrating a configuration example of computer hardware configured to execute the above-mentioned series of processing processes by a program.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other by a bus 105. To the bus 105, an input/output interface 106 is further connected, and the input/output interface 106 is connected to an external member.

In the computer configured as described above, the CPU 101 loads, for example, a program stored in the ROM 102 and the EEPROM 104 on the RAM 103 via the bus 105 to execute the program, to thereby perform the above-mentioned series of processing processes. Further, the program that the computer (CPU 101) executes can be written to the ROM 102 in advance or externally installed or updated on the EEPROM 104 via the input/output interface 106.

<Combination Examples of Configurations>

Note that, the present technology may also take the following configurations.

(1)

A communication apparatus configured to establish communication via a bus by a first communication apparatus that has an initiative in communication and at least one second communication apparatus configured to establish communication under control by the first communication apparatus,
in which the first communication apparatus includes:
an acquisition unit configured to acquire, from the at least one second communication apparatus, a max transfer length indicating a maximum transfer length that the at least one second communication apparatus is transferable in one data transfer;
a transmission/reception control unit configured to control transmission/reception of data so that data to be transferred in one data transfer has a data length equal to or shorter than the max transfer length in data transfer to/from the at least one second communication apparatus; and
a transmission unit configured to transmit transfer length information indicating the data length of the data to be transferred, prior to data transfer of the data.

(2)

The communication apparatus according to Item (1),
in which the transmission/reception control unit transfers, in a case where data having a data length equal to or longer than the max transfer length is requested to be transferred, the data requested to be transferred by dividing the data to have a data length equal to or shorter than the max transfer length, and
the transmission unit transmits the transfer length information indicating a data length of data obtained through division by the transmission/reception control unit.

(3)

The communication apparatus according to Item (1) or (2), in which
when write transfer of transferring data to be written to the at least one second communication apparatus is performed, the acquisition unit acquires a max write length that is the max transfer length in the write transfer by the at least one second communication apparatus, the transmission/reception control unit transfers, in a case where data having a data length equal to or longer than the max write length is requested to be transferred, the data requested to be transferred by dividing the data to have a data length equal to or shorter than the max write length, and transmitting the data through a plurality of transmissions, and
the transmission unit transmits the transfer length information indicating a data length of data obtained through division by the transmission/reception control unit, in each transfer of the data.

(4)

The communication apparatus according to any one of Items (1) to (3), in which
when read transfer of transferring data read out from the at least one second communication apparatus is performed, the acquisition unit acquires a max read length that is the max transfer length in the read transfer by the at least one second communication apparatus, the transmission/reception control unit transfers, in a case where data having a data length equal to or longer than the max read length is requested to be transferred, the data requested to be transferred by dividing the data to have a data length equal to or shorter than the max read length, and transmitting the data through a plurality of transmissions, and
the transmission unit transmits the transfer length information indicating a data length of data obtained through division by the transmission/reception control unit, in each transfer of the data.

(5)

The communication apparatus according to any one of Items (1) to (3), in which
when read transfer of transferring data read out from the at least one second communication apparatus is performed, the acquisition unit acquires a max read length that is the max transfer length in the read transfer by the at least one second communication apparatus, the transmission/reception control unit transfers, in a case where data having a data length equal to or longer than the max read length is requested to be transferred, the data requested to be transferred by dividing the data to have a data length equal to or shorter than the max read length, and transmitting the data through a plurality of transmissions, and
the transmission unit transmits the transfer length information indicating a data length of entire data requested to be transferred only once.

(6)

The communication apparatus according to any one of Items (1) to (5),
in which the at least one second communication apparatus includes an error notification unit configured to notify, in a case where occurrence of an error that prevents the transfer length information from being normally received is at least detected, a processing unit of the occurrence of the error, the processing unit being configured to perform processing in an upper layer, and
the upper layer ignores any communication until receiving a combination of a command that is an instruction to restart communication and a command that is an instruction to write the data or until receiving a command that is an instruction to end communication.

(7)

A communication method for establishing communication via a bus by a first communication apparatus that has an initiative in communication and at least one second communication apparatus configured to establish communication under control by the first communication apparatus,
the communication method including the steps of:
by the first communication apparatus,
acquiring, from the at least one second communication apparatus, a max transfer length indicating a maximum transfer length that the at least one second communication apparatus is transferable in one data transfer;

controlling transmission/reception of data so that data to be transferred in one data transfer has a data length equal to or shorter than the max transfer length in data transfer to/from the at least one second communication apparatus; and transmitting transfer length information indicating the data length of the data to be transferred, prior to data transfer of the data.

(8)

A program to be executed by a computer of a communication apparatus configured to establish communication via a bus by a first communication apparatus that has an initiative in communication and at least one second communication apparatus configured to establish communication under control by the first communication apparatus, the program causing the computer to execute communication processing including the steps of:
by the first communication apparatus,
acquiring, from the at least one second communication apparatus, a max transfer length indicating a maximum transfer length that the at least one second communication apparatus is transferable in one data transfer;

controlling transmission/reception of data so that data to be transferred in one data transfer has a data length equal to or shorter than the max transfer length in data transfer to/from the at least one second communication apparatus; and transmitting transfer length information indicating the data length of the data to be transferred, prior to data transfer of the data.

(9)

A communication system configured to establish communication by a first communication apparatus that has an initiative in communication via a bus and at least one second communication apparatus configured to establish communication under control by the first communication apparatus,
in which the first communication apparatus includes:
an acquisition unit configured to acquire, from the at least one second communication apparatus, a max transfer length indicating a maximum transfer length that the at least one second communication apparatus is transferable in one data transfer;
a transmission/reception control unit configured to control transmission/reception of data so that data to be transferred in one data transfer has a data length equal to or shorter than the max transfer length in data transfer to/from the at least one second communication apparatus; and
a transmission unit configured to transmit transfer length information indicating the data length of the data to be transferred, prior to data transfer of the data.

Note that, the present embodiment is not limited to the embodiments described above, and various modifications can be made thereto without departing from the gist of the present disclosure.

REFERENCE SIGNS LIST

11 Bus IF, 12 I3C master, 13 I3C slave, 14-1 Data signal line, 14-2 Clock signal line, 21 Data transmission unit, 22 Data reception unit, 23 Command transmission unit, 24 Mode control unit, 25 Transmission/reception control unit, 31 Data transmission unit, 32 Data reception unit, 33 Command interpretation unit, 34 Mode control unit, 35 Reception control unit, 41 System controller, 42 CCI layer processing unit, 43 CPU, 44 Internal bus, 51 Register address management unit, 52 Transfer length information holding unit, 53 Write transfer end control unit, 54 Invalid data processing unit, 55 Transfer length information transmission unit, 61 Controlled device, 62 CCI layer processing unit, 63 Device control unit, 64 Internal bus, 71 Register address management unit, 72 Register R/W control unit, 73 Read transfer end control unit, 74 Invalid data processing unit, 75 Transfer length information holding unit

The invention claimed is:

1. A master device configured to establish communication with at least one slave device via a bus, the master device comprising:
acquisition circuitry configured to acquire, from the at least one slave device, a max transfer length indicating a maximum transfer length that the at least one slave device is configured to transfer in one data transfer cycle;
a transmission/reception controller configured to control transmission/reception of data so that data transferred to/from the at least one slave device in one data transfer cycle has a transferred data length equal to or shorter than the max transfer length; and
a transmitter configured to transmit information indicating the transferred data length prior to each data transfer cycle,
wherein
in connection with performing read transfer from the at least one slave device, the acquisition circuitry acquires a max read length from the at least one slave device that is the max transfer length in the read transfer,
in a case where requested data to be transferred has a data length equal to or longer than the max read length, the transmission/reception controller divides the requested data into data portions each having a portion length equal to or shorter than the max read length, and respectively transmits the data portions in a plurality of transfer cycles, and
the transmitter is required to transmit information indicating a total data length of the requested data only once.

2. The master device according to claim 1, wherein
in a case where the requested data has a data length equal to or longer than the max transfer length, the transmission/reception controller divides the requested data into data portions each having a portion length equal to or shorter than the max transfer length, and
the transmitter is required to transmit information indicating a data length of data obtained through division by the transmission/reception controller.

3. The master device according to claim 1, wherein
in connection with performing write transfer to the at least one slave device, the acquisition circuitry acquires a max write length from the at least one slave device that is the max transfer length in the write transfer,
in a case where the requested data has a data length equal to or longer than the max write length, the transmission/reception controller divides the requested data into data portions each having a portion length equal to or shorter than the max write length, and respectively transmits the data portions in the plurality of transfer cycles, and
the transmitter is required to transmit information indicating a data length of data obtained through division by the transmission/reception controller, in each of the plurality of transfer cycles.

4. A slave device configured to establish communication with a master device via a bus, the slave device comprising:
   error notification circuitry configured to notify a processor of an error that prevents information indicating portion data length of requested data to be transferred from being normally received, the processor being configured to perform processing in an upper layer, and
   a receiver configured to receive information indicating a total data length of the requested data, the information being transferred only once when the requested data is transferred to the master device,
   wherein the upper layer ignores any communication until receiving both a command that is an instruction to restart communication and a command that is an instruction to write the requested data or until receiving a command that is an instruction to end communication,
   in a case where the requested data has a data length equal to or longer than a max transfer length that the at least one slave device is configured to transfer in one data transfer cycle, the master device divides the requested data into data portions each having a portion length equal to or shorter than the max transfer length, and
   the master device is required to transmit information indicating a data length of data obtained through division by the master device.

5. The slave device according to claim 4, wherein
   in connection with performing read transfer from the at least one slave device, the master device acquires a max read length from the at least one slave device that is a maximum transfer length that the at least one slave device is configured to transfer in one data transfer cycle of the read transfer,
   in a case where the requested data has a data length equal to or longer than the max read length, the master device divides the requested data into data portions each having a portion length equal to or shorter than the max read length, and respectively transmits the data portions in a plurality of transfer cycles, and
   the master device is required to transmit information indicating a data length of data obtained through division by the master device in each of the plurality of transfer cycles.

6. The slave device according to claim 4, wherein
   in connection with performing write transfer to the at least one slave device, the master device acquires a max write length from the at least one slave device that is a maximum transfer length that the at least one slave device is configured to transfer in one data transfer cycle of the write transfer,
   in a case where the requested data has a data length equal to or longer than the max write length, the master device divides the requested data into data portions each having a portion length equal to or shorter than the max write length, and respectively transmits the data portions in a plurality of transfer cycles, and
   the master device is required to transmit information indicating a data length of data obtained through division by the master device in each of the plurality of transfer cycles.

7. A communication method for establishing communication with at least one slave device via a bus by a master device,
   comprising the steps of:
   acquiring, from the at least one slave device, a max transfer length indicating a maximum transfer length that the at least one slave device is configured to transfer in one data transfer cycle;
   controlling transmission/reception of data so that data transferred to/from the at least one slave device in one data transfer cycle has a transferred data length equal to or shorter than the max transfer length; and
   transmitting information indicating the transferred data length prior to each data transfer cycle
   wherein
      in connection with performing read transfer from the at least one slave device, the master device acquires a max read length from the at least one slave device that is the max transfer length in the read transfer,
      in a case where requested data to be transferred has a data length equal to or longer than the max read length, the master device divides the requested data into data portions each having a portion length equal to or shorter than the max read length, and respectively transmits the data portions in a plurality of transfer cycles, and
      the master device is required to transmit information indicating a total data length of requested data only once.

8. The communication method according to claim 7, wherein
   in a case where the requested data has a data length equal to or longer than the max transfer length, transmission/reception of data is controlled by dividing the requested data into data portions each having a portion length equal to or shorter than the max transfer length, and
   transmitting information is required to indicate a data length of data obtained through division during the transmission/reception of data.

9. The communication method according to claim 7, wherein
   in connection with performing write transfer to the at least one slave device, acquiring the max transfer length is performed by acquiring a max write length from the at least one slave device that is the max transfer length in the write transfer,
   in a case where the requested data has a data length equal to or longer than the max write length, transmission/reception of data is controlled by dividing the requested data into data portions each having a portion length equal to or shorter than the max write length, and the data portions are respectively transmitted in the plurality of transfer cycles, and
   transmitting information is required to indicate a data length of data obtained through division during the transmission/reception of data in each of the plurality of transfer cycles.

10. A non-transitory computer readable medium storing program code for transfer control where a master device is configured to establish communication with at least one slave device via a bus, the program code being executable by a processor to perform operations comprising:
   acquiring, from the at least slave device, a max transfer length indicating a maximum transfer length that the at least one slave device is configured to transfer in one data transfer cycle;
   controlling transmission/reception of data so that data transferred to/from the at least one slave device in one data transfer cycle has a transferred data length equal to or shorter than the max transfer length; and
   transmitting information indicating the transferred data length prior to each data transfer cycle wherein
in connection with performing read transfer from the at least one slave device, the master device acquires a max read length from the at least one slave device that is the max transfer length in the read transfer, in a case where requested data to be transferred has a data length equal to or longer than the max read length, the master device divides the requested data into data portions each having a portion length equal to or shorter than the max read length, and respectively transmits the data portions in a plurality of transfer cycles, and the master device is required to transmit information indicating a total data length of requested data only once.

11. The non-transitory computer readable medium according to claim 10, wherein
in a case where the requested data has a data length equal to or longer than the max transfer length, transmission/reception of data is controlled by dividing the requested data into data portions each having a portion length equal to or shorter than the max transfer length, and transmitting information is required to indicate a data length of data obtained through division during the transmission/reception of data.

12. The non-transitory computer readable medium according to claim 10, wherein
in connection with performing write transfer to the at least one slave device, acquiring the max transfer length is performed by acquiring a max write length from the at least one slave device that is the max transfer length in the write transfer, in a case where the requested data has a data length equal to or longer than the max write length, transmission/reception of data is controlled by dividing the requested data into data portions each having a portion length equal to or shorter than the max write length, and the data portions are respectively transmitted in the plurality of transfer cycles, and transmitting information is required to indicate a data length of data obtained through division during the transmission/reception of data in each of the plurality of transfer cycles.

13. A communication system comprising:
a slave device, and
a master device, the master device comprising:
acquisition circuitry configured to acquire, from the slave device, a max transfer length indicating a maximum transfer length that the slave device is configured to transfer in one data transfer cycle;

a transmission/reception controller configured to control transmission/reception of data so that data transferred to/from the slave device in one data transfer cycle has a transferred data length equal to or shorter than the max transfer length; and a transmitter configured to transmit information indicating the transferred data length prior to each data transfer cycle, wherein
in connection with performing read transfer from the slave device, the acquisition circuitry acquires a max read length from the slave device that is the max transfer length in the read transfer, in a case where requested data to be transferred has a data length equal to or longer than the max read length, the transmission/reception controller divides the requested data into data portions each having a portion length equal to or shorter than the max read length, and respectively transmits the data portions in a plurality of transfer cycles, and the transmitter is required to transmit information indicating a total data length of the requested data only once.

* * * * *